United States Patent
Winter et al.

(10) Patent No.: US 12,270,002 B2
(45) Date of Patent: Apr. 8, 2025

(54) PROCESS OF TREATING CARBONACEOUS MATERIAL AND APPARATUS THEREFOR

(71) Applicant: Seata Holdings Pty Ltd, New South Wales (AU)

(72) Inventors: John David Winter, Glen Innes (AU); James McFarlane, Weston (AU)

(73) Assignee: Seata Holdings Pty Ltd (AU)

( * ) Notice: Subject to any disclaimer, the term of this patent is extended or adjusted under 35 U.S.C. 154(b) by 848 days.

(21) Appl. No.: 17/284,088

(22) PCT Filed: Oct. 10, 2019

(86) PCT No.: PCT/AU2019/051099
§ 371 (c)(1),
(2) Date: Apr. 9, 2021

(87) PCT Pub. No.: WO2020/073092
PCT Pub. Date: Apr. 16, 2020

(65) Prior Publication Data
US 2021/0348072 A1  Nov. 11, 2021

(30) Foreign Application Priority Data

Oct. 10, 2018 (AU) ............................. 2018903826
May 13, 2019 (AU) ............................. 2019901620

(51) Int. Cl.
*C10J 3/46* (2006.01)
*B01J 8/00* (2006.01)
(Continued)

(52) U.S. Cl.
CPC .............. *C10J 3/463* (2013.01); *B01J 8/0015* (2013.01); *B01J 8/04* (2013.01); *B01J 21/063* (2013.01);
(Continued)

(58) Field of Classification Search
CPC ..... C10J 3/463; C10J 3/482; C10J 3/62; C10J 2200/06; C10J 2300/0916;
(Continued)

(56) References Cited

U.S. PATENT DOCUMENTS 7,214,252 B1  5/2007  Krumm et al.
8,007,688 B2  8/2011  Dahlin et al.
(Continued)

FOREIGN PATENT DOCUMENTS

EP  2895576  7/2015
JP  S47-34474 B  10/1972
(Continued)

OTHER PUBLICATIONS

Yao et al., Biomass gasification for syngas and biochar co-production: Energy application and economic evaluation , 2018, Applied Energy, 209, 43-55 (Year: 2018).*
(Continued)

*Primary Examiner* — Stefanie J Cohen
*Assistant Examiner* — Ritu S Shirali
(74) *Attorney, Agent, or Firm* — Barnes & Thornburg LLP; G. Peter Nichols

(57) ABSTRACT

A process for processing carbonaceous material includes delivering a carbonaceous material to a reactor; delivering a catalyst to the reactor; processing the carbonaceous material at a relatively low temperature within the reactor to decompose the carbonaceous material to base compounds.

13 Claims, 24 Drawing Sheets

(51) Int. Cl.
*B01J 8/04* (2006.01)
*B01J 21/06* (2006.01)
*B01J 23/745* (2006.01)
*C10J 3/48* (2006.01)
*C10J 3/62* (2006.01)
*C10K 1/02* (2006.01)
*C10K 3/00* (2006.01)
*C10K 3/02* (2006.01)

(52) U.S. Cl.
CPC .............. *B01J 23/745* (2013.01); *C10J 3/482* (2013.01); *C10J 3/62* (2013.01); *C10K 1/02* (2013.01); *C10K 3/001* (2013.01); *C10K 3/023* (2013.01); *B01J 2208/00017* (2013.01); *C10J 2200/06* (2013.01); *C10J 2300/0916* (2013.01); *C10J 2300/0946* (2013.01); *C10J 2300/0986* (2013.01); *C10J 2300/0993* (2013.01); *C10J 2300/1807* (2013.01)

(58) Field of Classification Search
CPC ........ C10J 2300/0946; C10J 2300/0986; C10J 2300/0993; C10J 2300/1807; C10J 3/12; C10J 3/06; C10J 2300/0913; C10J 2300/12; B01J 8/0015; B01J 8/04; B01J 21/063; B01J 23/745; B01J 2208/00017; C10K 1/02; C10K 3/001; C10K 3/023; C10K 1/122; C10K 3/02; Y02P 20/52; C10B 49/16; C10B 53/00; C10B 57/06; C10G 1/086; C10G 1/10; C10G 11/04; C10G 11/14; C10G 1/04
USPC ........................................................ 252/373
See application file for complete search history.

(56) References Cited

U.S. PATENT DOCUMENTS

2015/0126627 A1    5/2015    Apanel et al.
2017/0066983 A1    3/2017    Douglas et al.

FOREIGN PATENT DOCUMENTS

| | | |
|---|---|---|
| JP | H10-072587 | 3/1998 |
| JP | H10-128288 | 5/1998 |
| JP | H11-148084 | 6/1999 |
| JP | 2007-217696 | 8/2007 |
| JP | 2018-114425 | 7/2018 |
| KR | 20110129849 | 12/2011 |
| RU | 2272064 | 3/2006 |
| WO | 2014/040634 | 3/2014 |
| WO | 2014131087 | 9/2014 |

OTHER PUBLICATIONS

New Jersey Sea Grant Consortium: Grain Size—How Big Are The Sand Grains? [online], [retrieved on May 8, 2024]. Retrieved from the internet: < URL: https://njseagrant.org/wp-content/uploads/2014/03/Grain_Size_How_Big.pdf> (Year: 2024).*

Berruti et al., Hydrodynamics of Circulating Fluidized Bed Risers: A Review, 1995, The Canadian Journal of Chemical Engineering, 73, 579-602 (Year: 1995).*

Written Opinion and International Search Report issued on Jan. 6, 2020 in PCT/AU/2019/051099.

International Preliminary Report on Patentability issued on Feb. 8, 2021 in PCT/AU2019/051099.

Partial Supplementary European Search issued in EP19870478.5 (2021).

English Translation of Office Action issued in BR112021006753-1 (Jul. 3, 02023).

English Translation of Office Action issued in JP2021-546021 (Aug. 15, 2023).

English Translation of Office Action & Search Report issued in RU2021112151 (Aug. 22, 2023).

English translation of Office Action issued in JP 2021-546021 (May 14, 2024).

Office Action from corresponding KR Patent Application No. 10-2021-7013947 (Oct. 11, 2024).

* cited by examiner

PROCESS OF TREATING CARBONACEOUS MATERIAL AND APPARATUS THEREFOR

This application is a U.S. nationalization under 35 U.S.C. § 371 of International Application No. PCT/AU2019/051099, filed Oct. 10, 2019, which claims priority to Australian Application No. 2019901620, filed May 13, 2019 and Australian Application No. 2018903826, filed Oct. 10, 2018; the entire contents of each are incorporated herein by reference.

TECHNICAL FIELD

This disclosure relates, in general, to processes of treating carbonaceous materials particularly material containing halide elements, and more particularly, to processes for treating carbonaceous material in a reactor and an associated system, the processes including a low temperature pyrolitic reaction with catalytic partial oxidation, either in-situ or in a separate step, and processes of recovering at least a portion of the products of the process.

BACKGROUND ART

Pyrolysis reactors provide thermochemical decomposition of organic material at elevated temperatures in the absence of oxygen or any halogen. Pyrolysis involves the simultaneous change of chemical composition and physical phase, and is irreversible. Reactor design can use two main modes of heat transfer to provide the energy for thermochemical conversion, direct, indirect or a combination of both. Indirect heating relies on metallic heat transfer surfaces, which is the limiting factor for scale-up of this type of equipment, resulting in multiple units operating in parallel to achieve reasonable plant through-put. This results in high capital cost, high maintenance cost, high operating cost and low thermal efficiency. Examples of this type of equipment are rotary kilns, drum kilns, retorts (fixed bed), auger, ablative and vacuum reactors. Some novel indirect heating methods include electrical (radiant and/or conduction), plasma, microwave and solar energy. These methods typically require cheap electricity and an inert carrier gas. Furthermore, these complex heating methods have high operational and capital cost.

Direct heat transfer can be achieved using a stream of hot spent combustion gases or recirculation of an inert gas (usually syngas). Using hot spent combustion gases causes significant dilution of the syngas with carbon dioxide and nitrogen, resulting in a very low calorific syngas that has limited uses because once cooled down it does not have sufficient fuel value for self-combustion. Using recirculation of syngas has the disadvantage of the off-gas cleaning system needing to be much larger to handle the extra recirculating gas volume and the gas must be re-compressed. In addition, the pyrolysis off-gas (raw syngas) must be wet scrubbed (cooled) to condense and remove the tars and oils. Therefore, the recycled gas must be re-compressed and re-heated from about 80'C to +800° C. on each cycle, resulting in low thermal efficiency and high operating cost. In addition, the recirculating syngas must be re-heated using an indirect heat-exchanger, resulting in higher capital cost. High gas flow through the pyrolysis reactor decreases the yield of biochar. Examples of this technology are fixed bed retorts, multi-hearth furnaces, fluid beds and entrained flow reactors.

The above references to the background art do not constitute an admission that the art forms a part of the common general knowledge of a person of ordinary skill in the art. The above references are also not intended to limit the application to actuators, methods of fabrication of an actuator and its composition as disclosed herein.

SUMMARY

The disclosure relates to processing of carbonaceous material in general, including contaminated organic materials, PFAS and other waste materials containing halide elements. It should also be appreciated that the process disclosed may find application with other carbonaceous materials.

In some forms, the process is utilised to treat organic material using pyrolysis to deconstruct the organic material feedstock to base components. In some forms, the process is a low thermal cost treatment of organic material including recovery of some of the products or outputs of the treatment, such as carbon. The process may be used to treat a diverse range of organic compositions such as PFAS, PVC, lignite, animal waste, woodchip, straw, biosolids. In some forms the process results in treatment of waste/contaminants (such as PFAS, biosolids, PVC), recovery of heat, recovery of energy; recovery of clean syngas; recovery of biochar; recovery of water; recovery of hydrogen, and recovery of soil.

However, it will be appreciated that the process is not limited to these uses or outputs. The process handles variability in feedstocks and can operate over a wide range of conditions.

According to a first aspect, disclosed is a process for processing carbonaceous material, the process comprising delivering a carbonaceous material to a reactor; delivering a catalyst to the reactor; processing the carbonaceous material at a relatively low temperature within the reactor to liberate and decompose organic compounds within the carbonaceous material.

In some forms the process comprises delivering a catalyst in the form of hot sand. In some forms sand comprises a loose or fine granular substance. In some forms the hot sand or catalyst is delivered at multiple spaced apart points along the length of the reactor. In some forms the hot sand or catalyst is mechanically mixed with the feedstock.

In some forms the catalyst comprises an iron oxide based catalyst. In some forms the catalyst comprises ilmenite. The process may include use of an absorbent, in-situ with the heat transfer media catalyst that is tailored to capture halide elements for the purpose of forming a more stable compound, allowing safe disposal. An example of this is calcium oxide which reacts in the presence of gaseous chlorine to form a very stable solid calcium chloride.

In some forms the process comprises recovering at least a portion of the catalyst from an output material and regenerating the catalyst for re-use in the process.

In some forms the reactor process results in an output material. In some forms the output includes biochar, in some forms biochar may be separated from the output material.

In some forms the process is arranged to restore some or all of the catalyst and some or all of the carbon or fuel to the reaction chamber.

In some forms the process comprises delivering syngas to a secondary reactor. The secondary reaction stage is provided to ensure further decomposition of any liberated gaseous organic compounds whereby off-gas from the first stage is contacted with fresh regenerated catalyst. Partial oxidation of these components to minimum constituent compounds occurs, sometimes termed gasification, possibly at a higher temperature than stage one pyrolysis, to form a clean non-contaminated syngas stream.

In some forms, disclosed is a process of processing multiple streams of carbonaceous material in parallel processes utilising a single fluid bed.

BRIEF DESCRIPTION

Notwithstanding any other forms that may fall within the scope of the process and apparatus as set forth, specific embodiments will now be described, by way of example only, with reference to the accompanying drawings in which.

Figure 5:
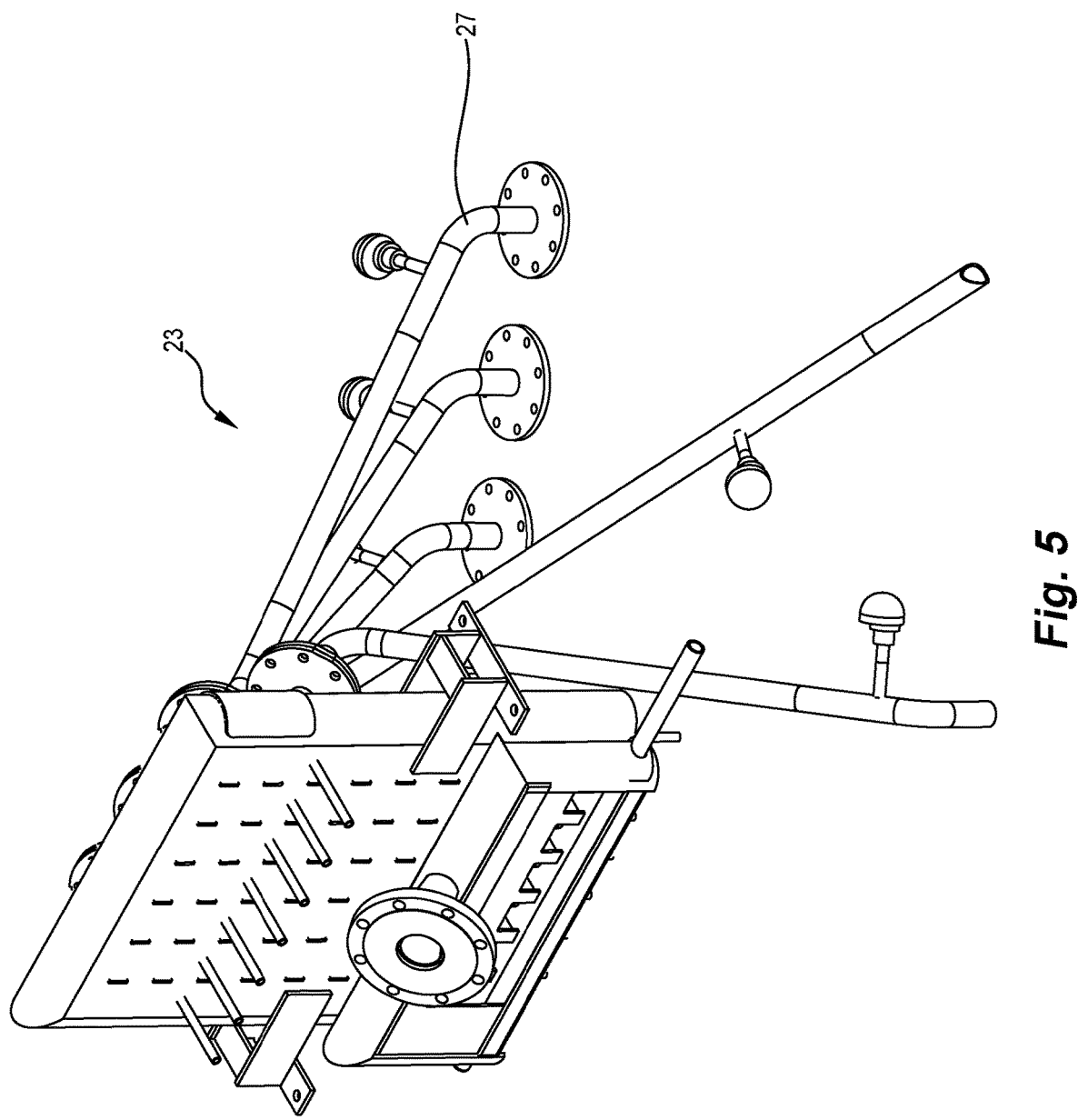
FIG. 5 shows an isometric front view of a distributor of one embodiment of the disclosure.
Figure 6:
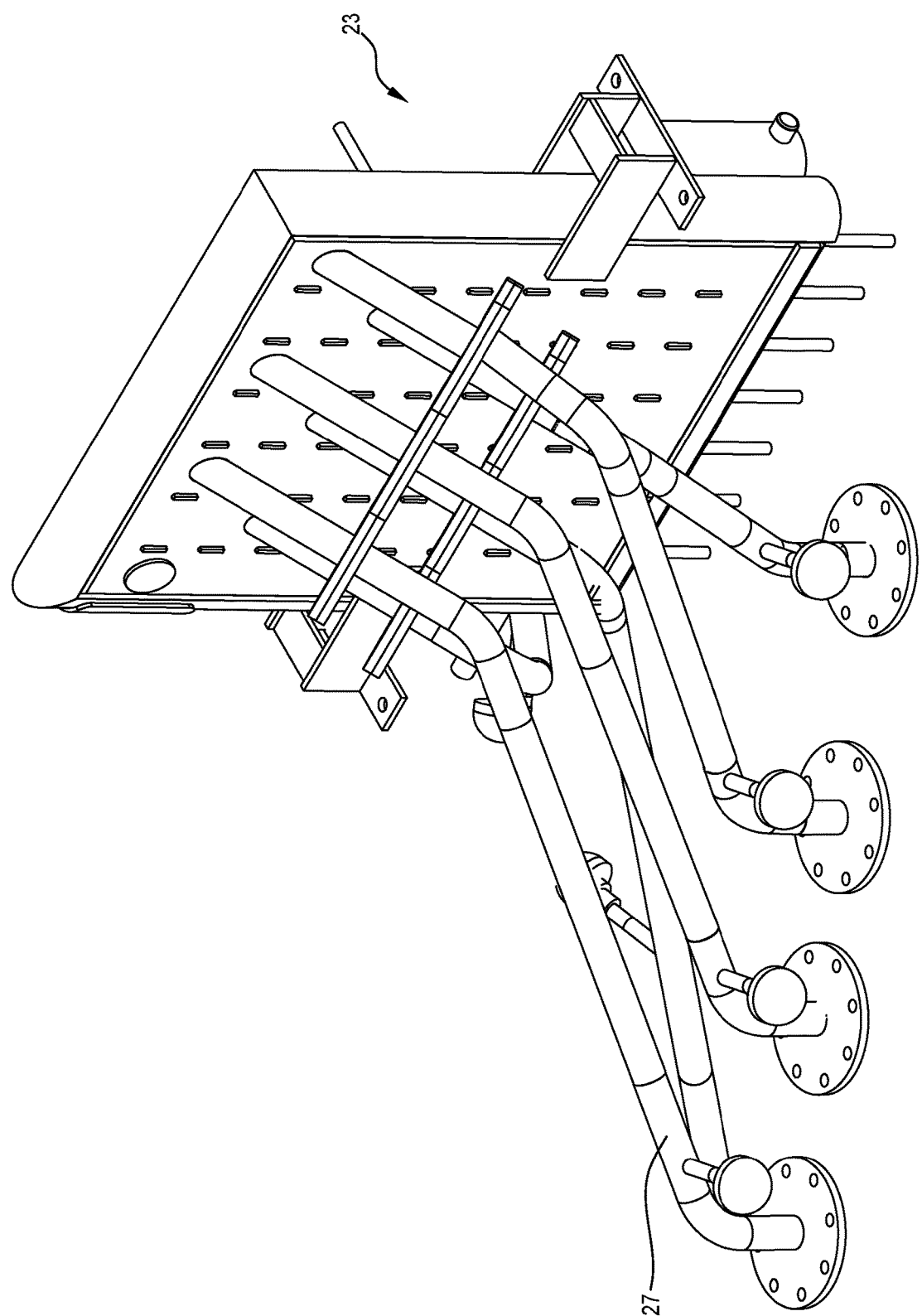
Figure 7:
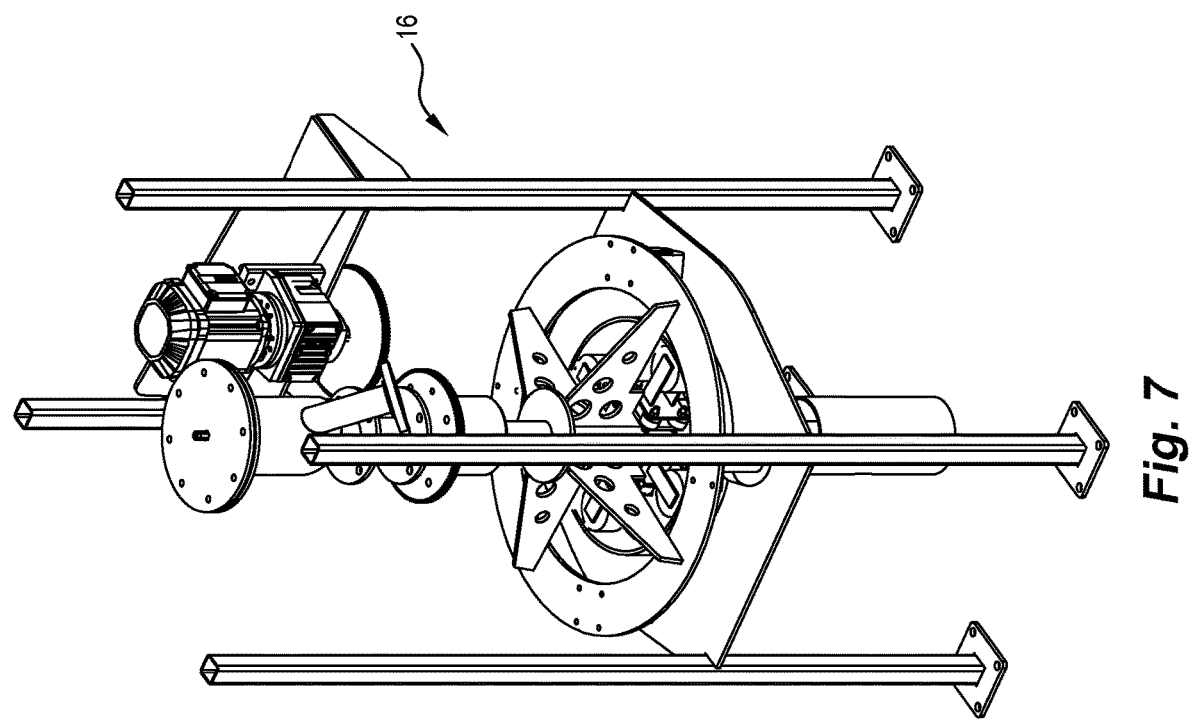
Figure 8:
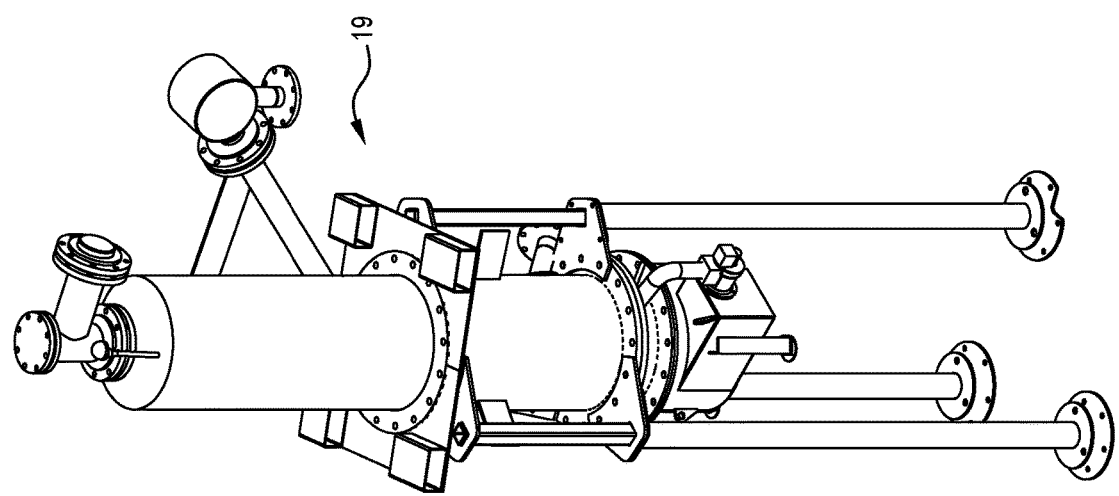
Figure 9:
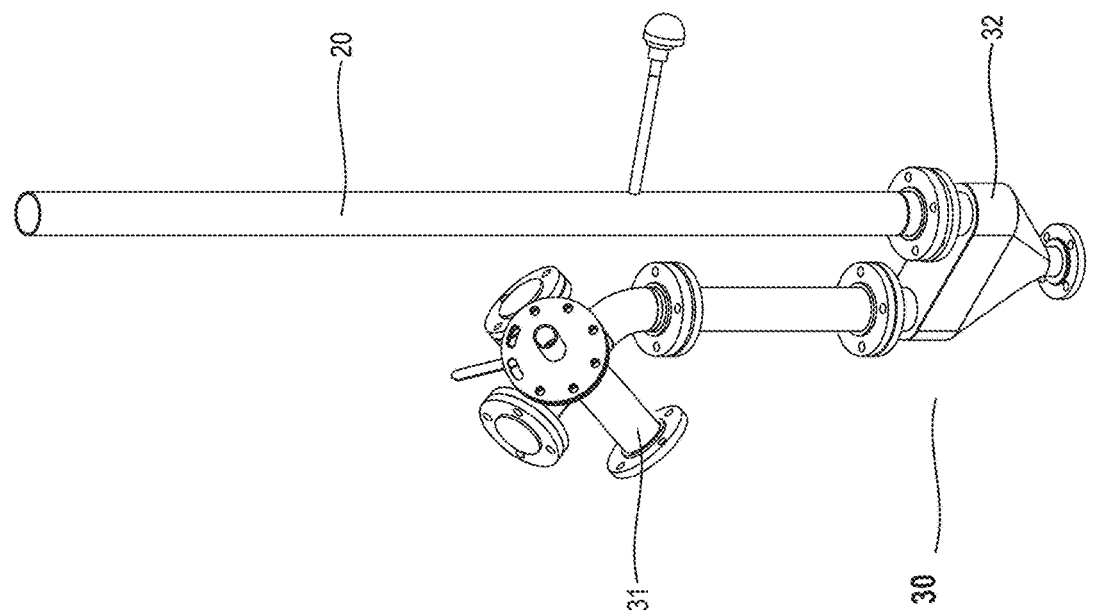
Figure 10:
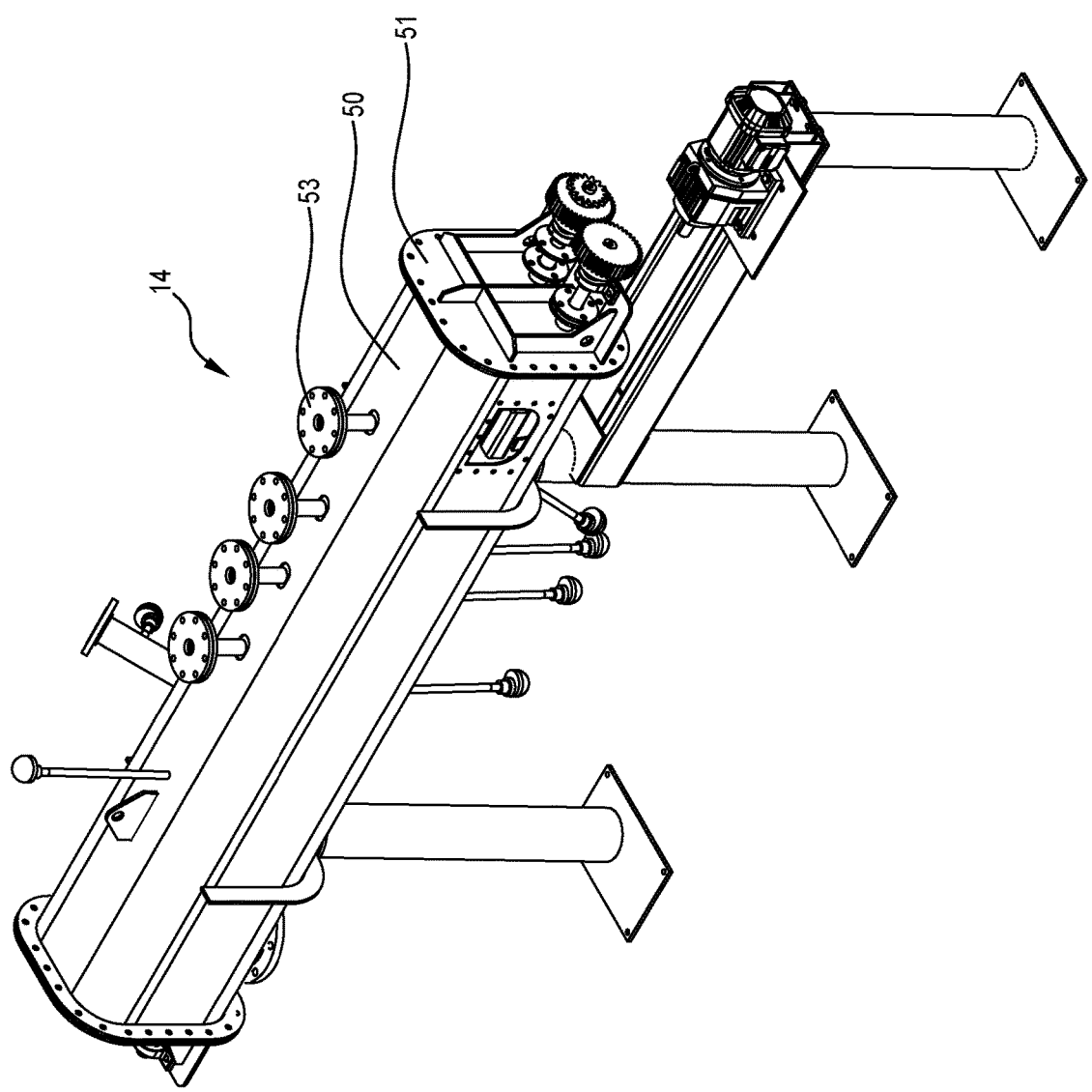
Figure 11:
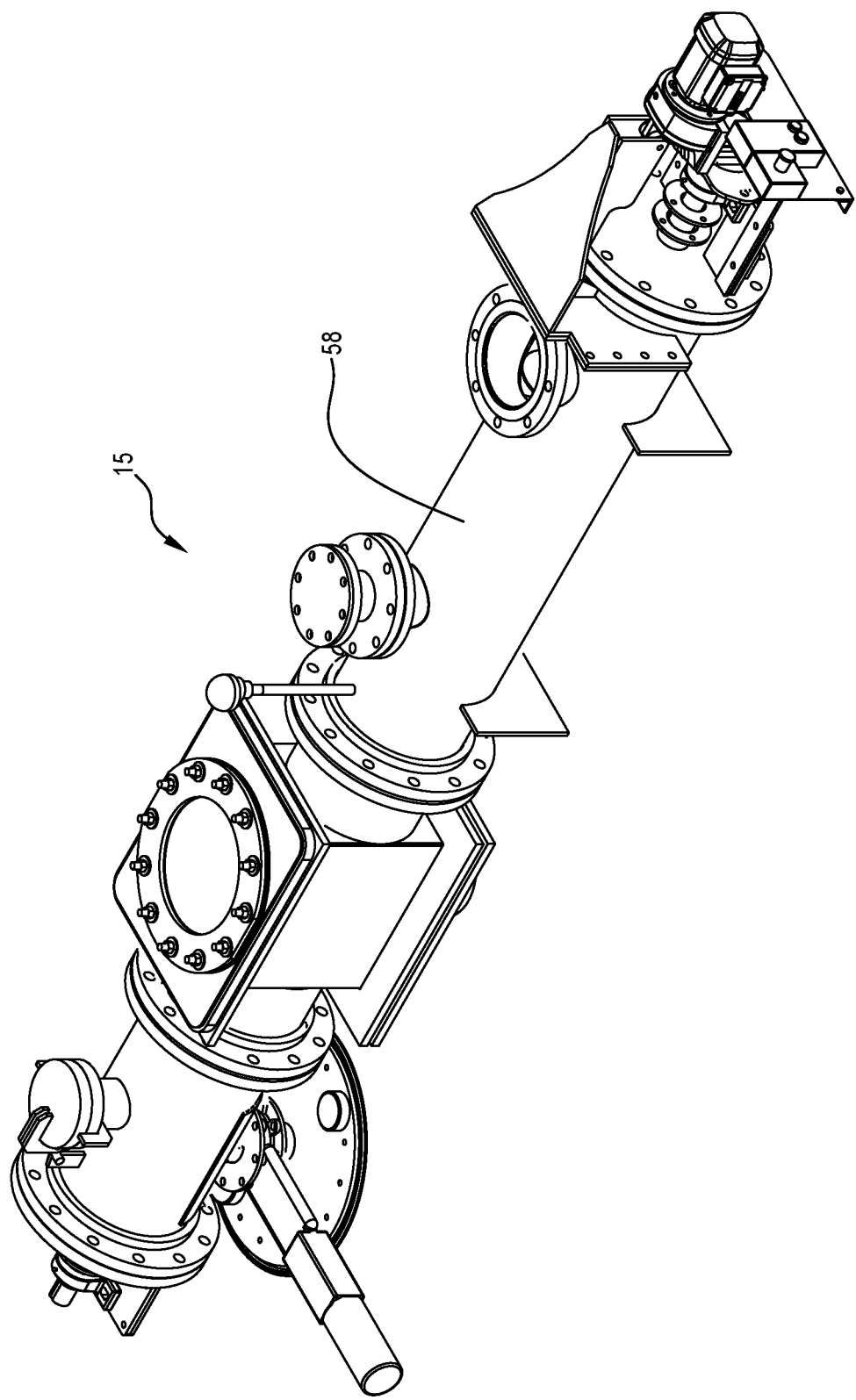
Figure 12:
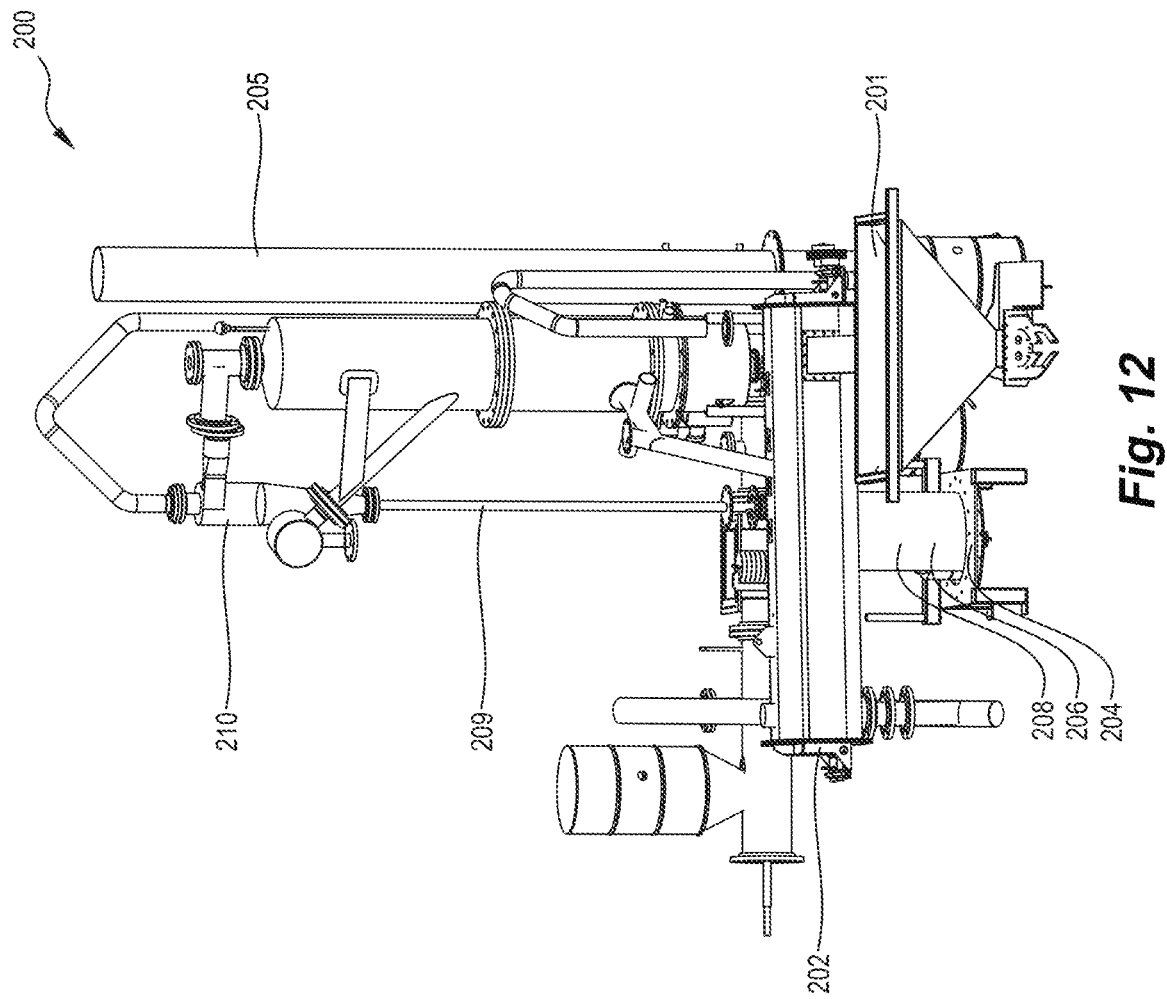
Figure 13:
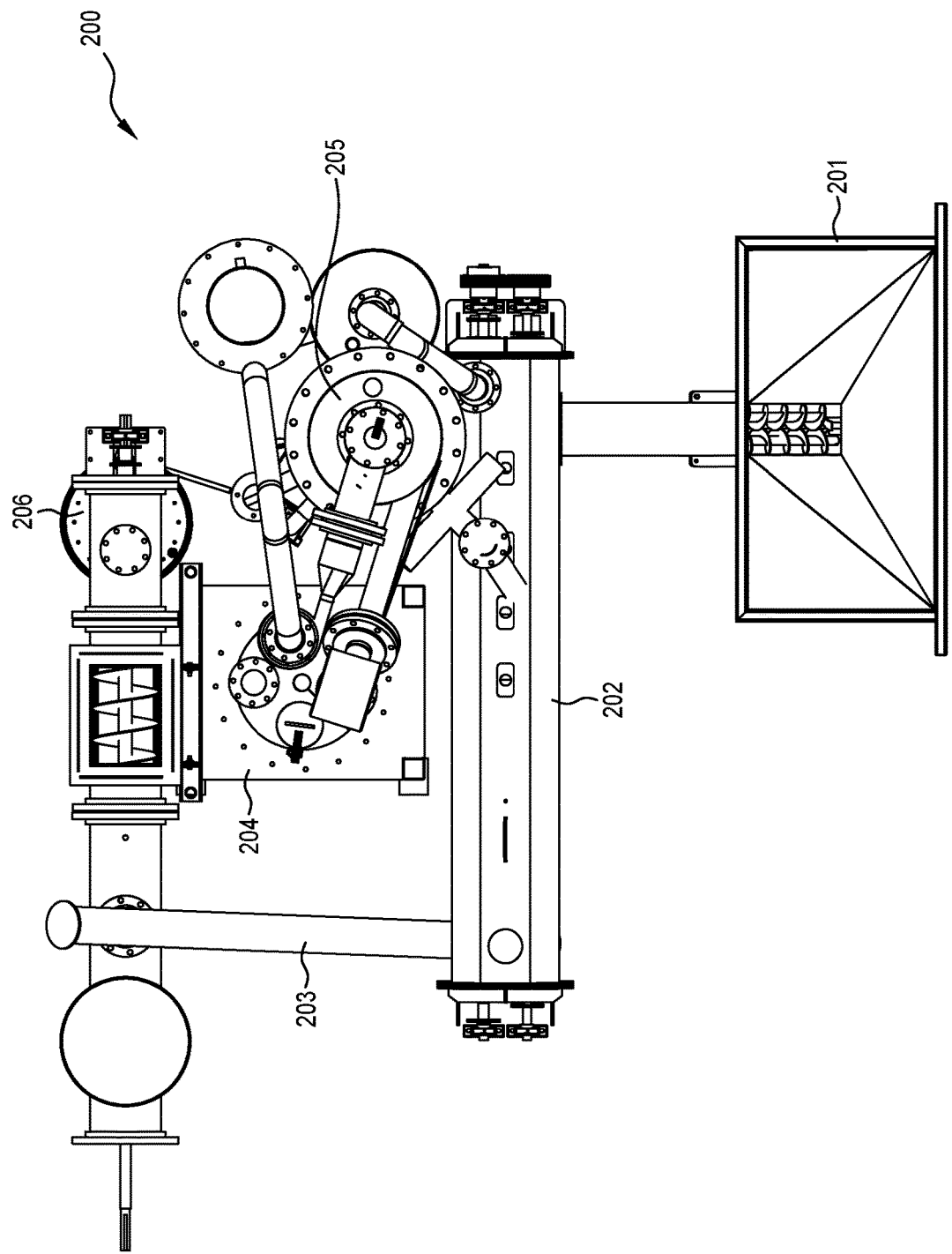
Figure 16:
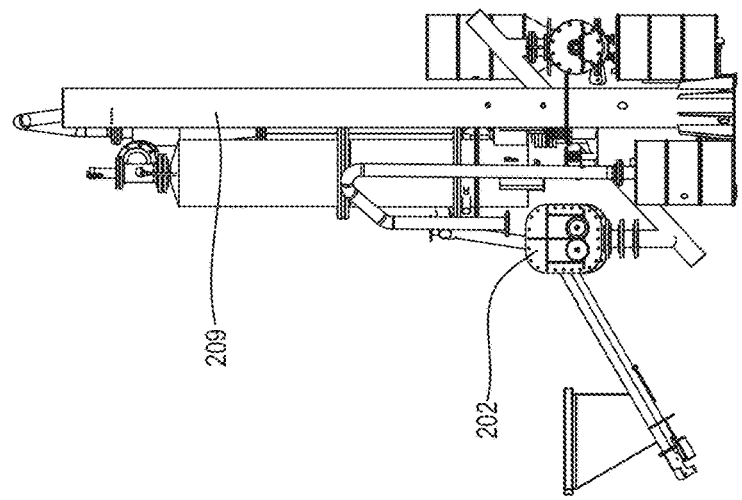
Figure 15:
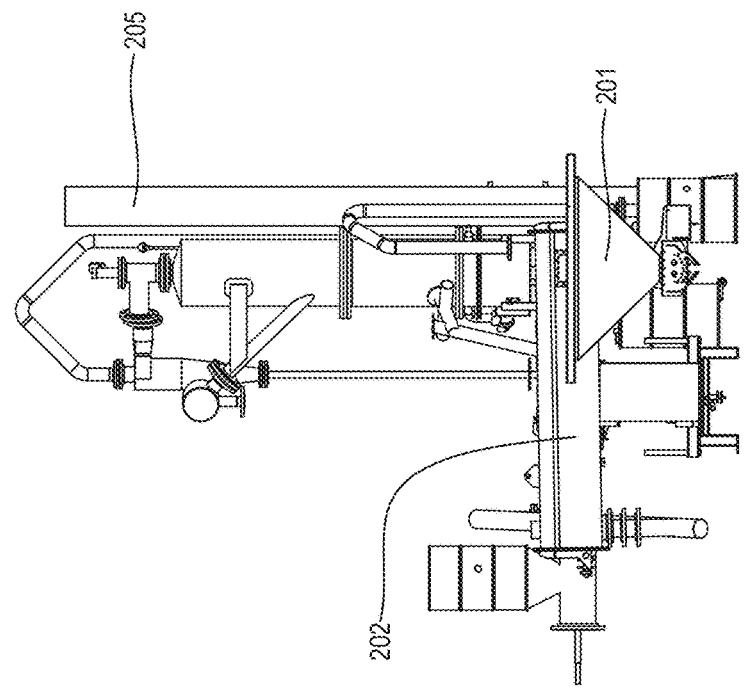
Figure 14:
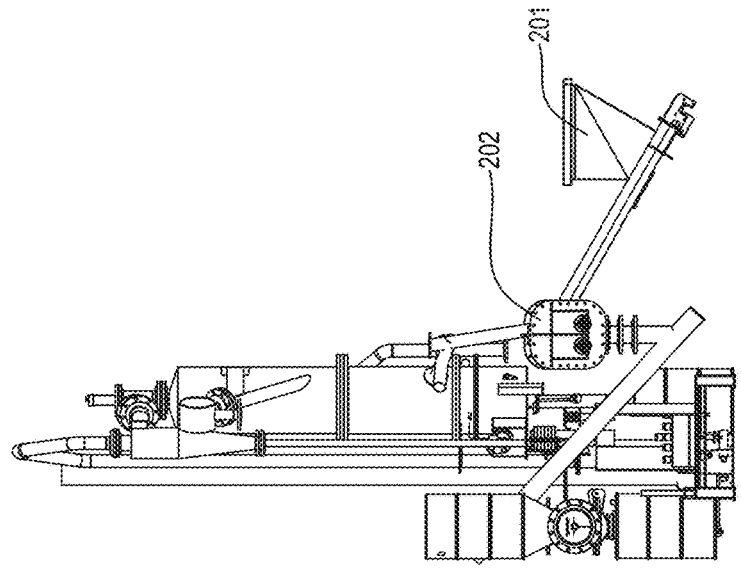
Figure 18:
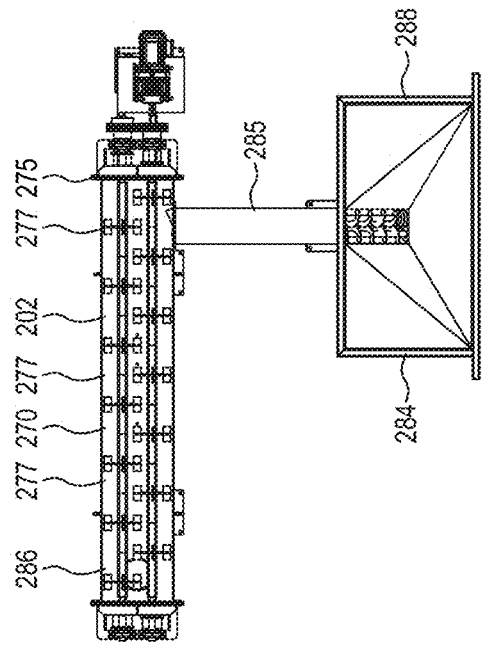
Figure 19:
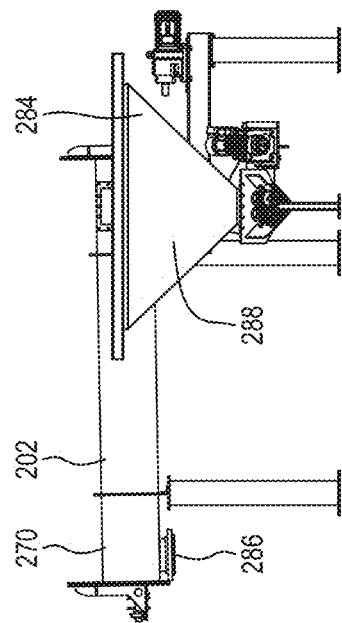
Figure 17:
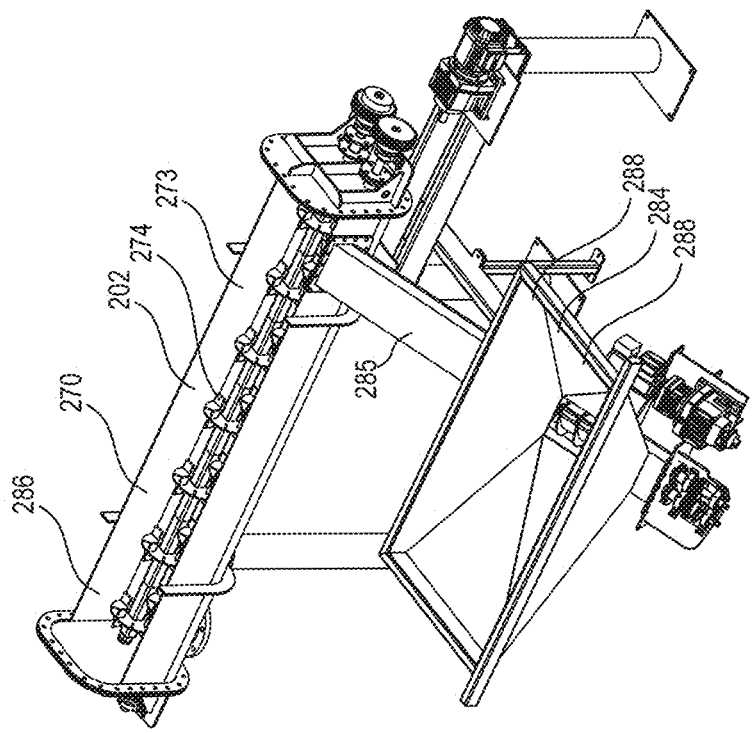
Figure 20:
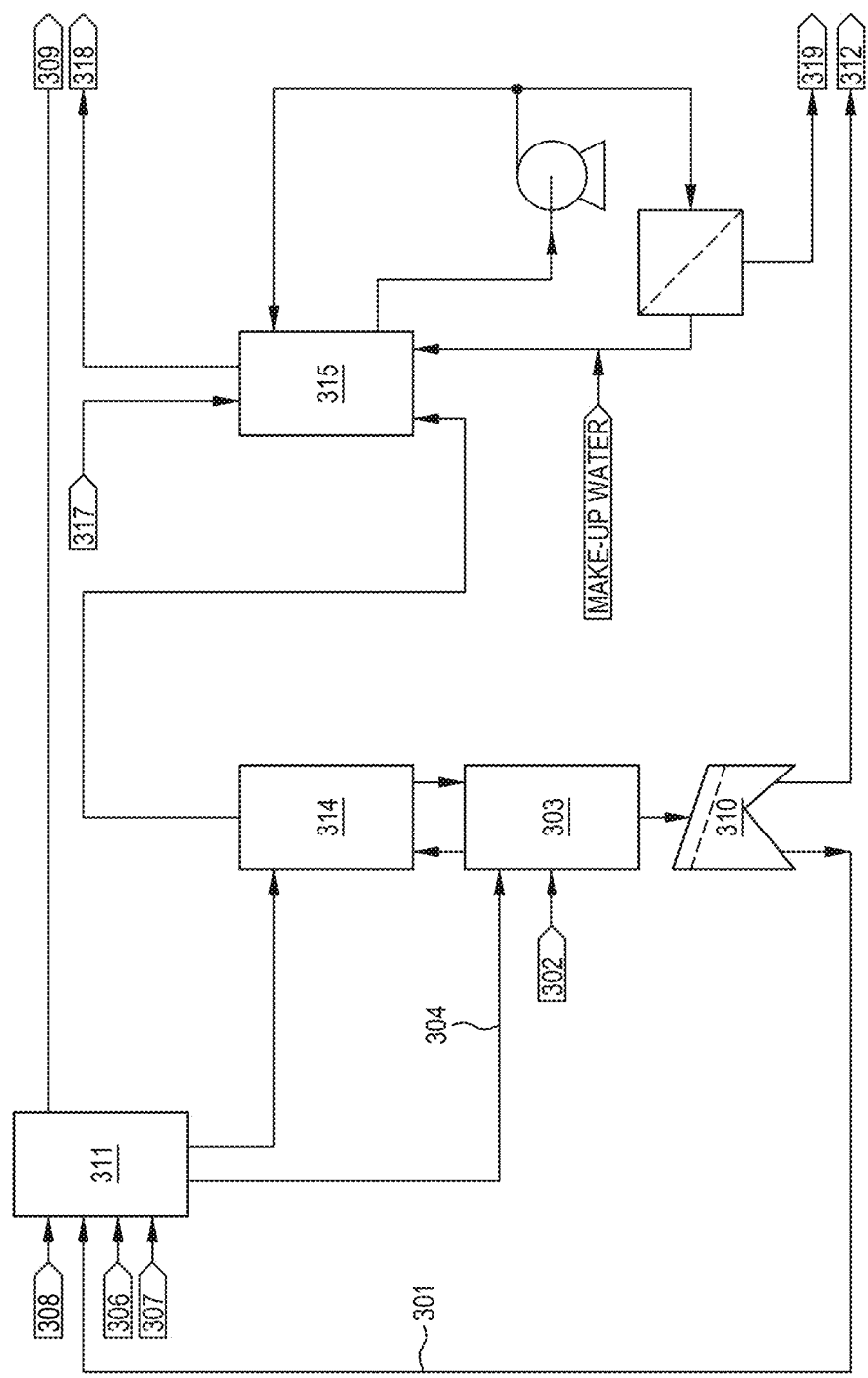
Figure 21:
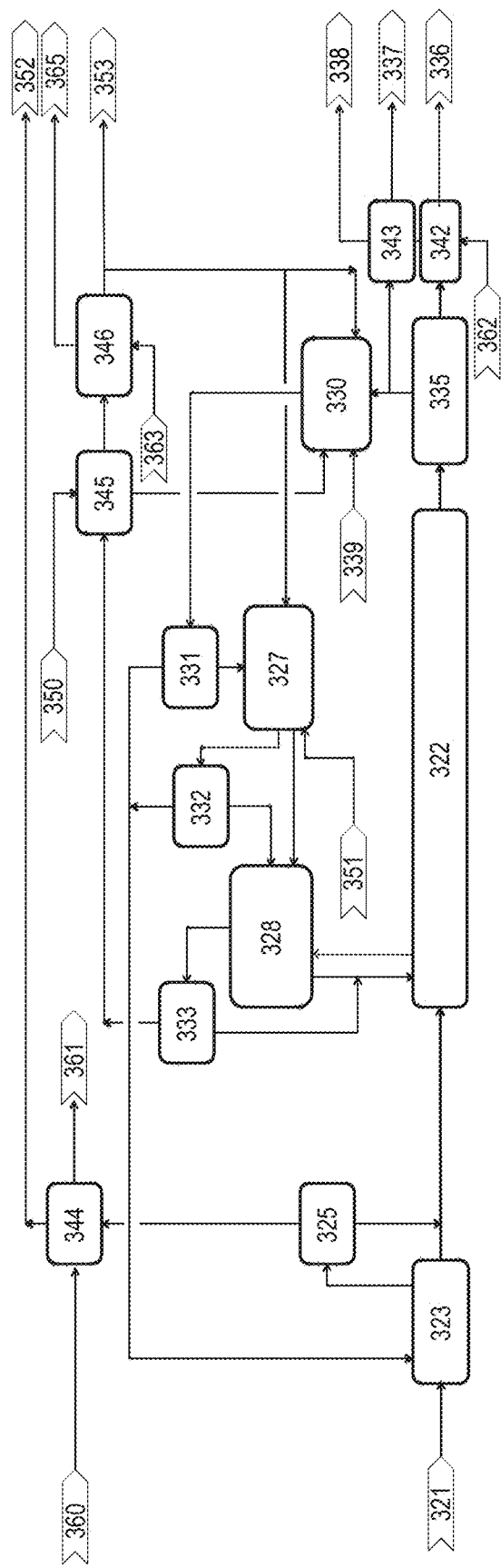
Figure 22:
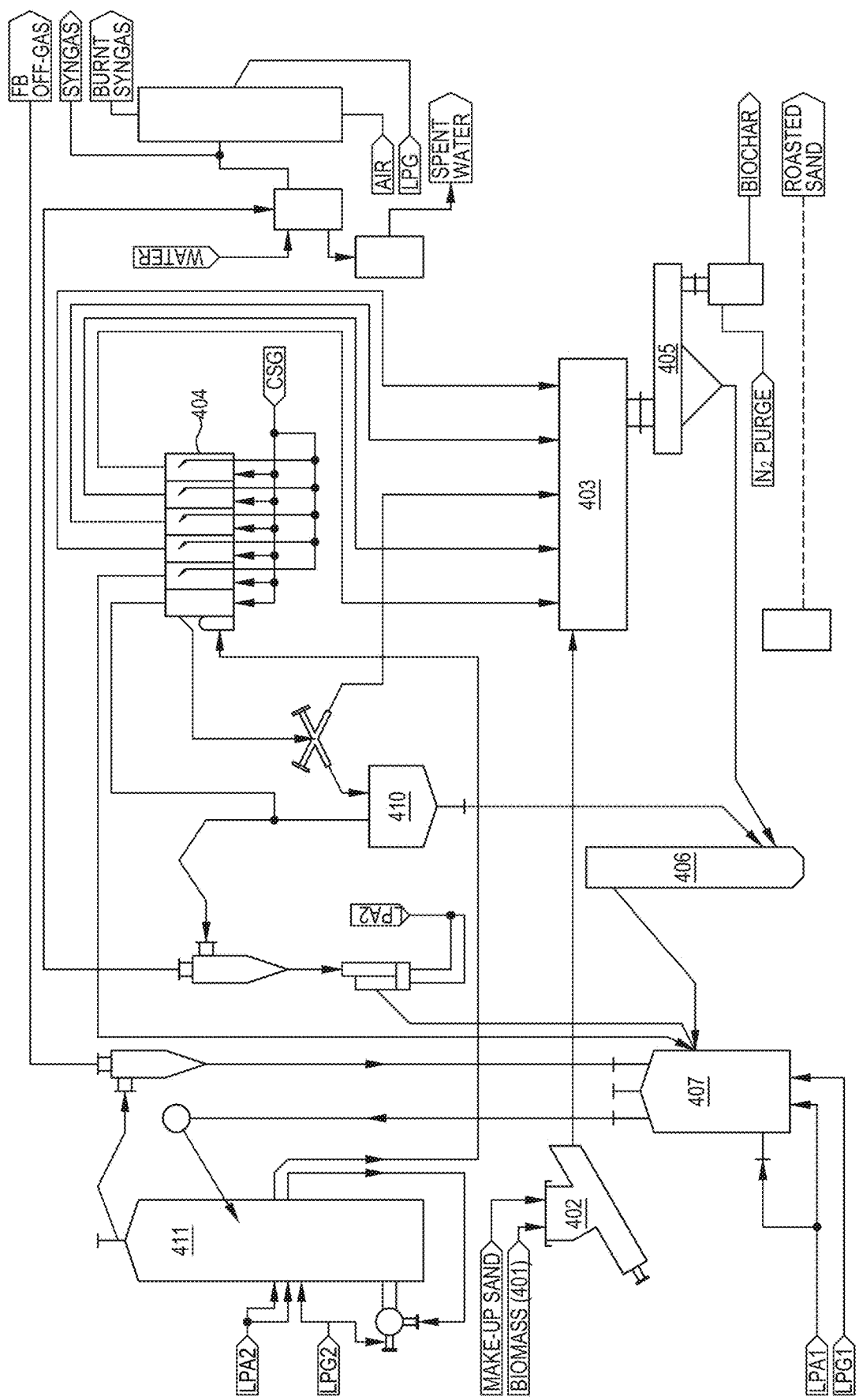
Figure 23:
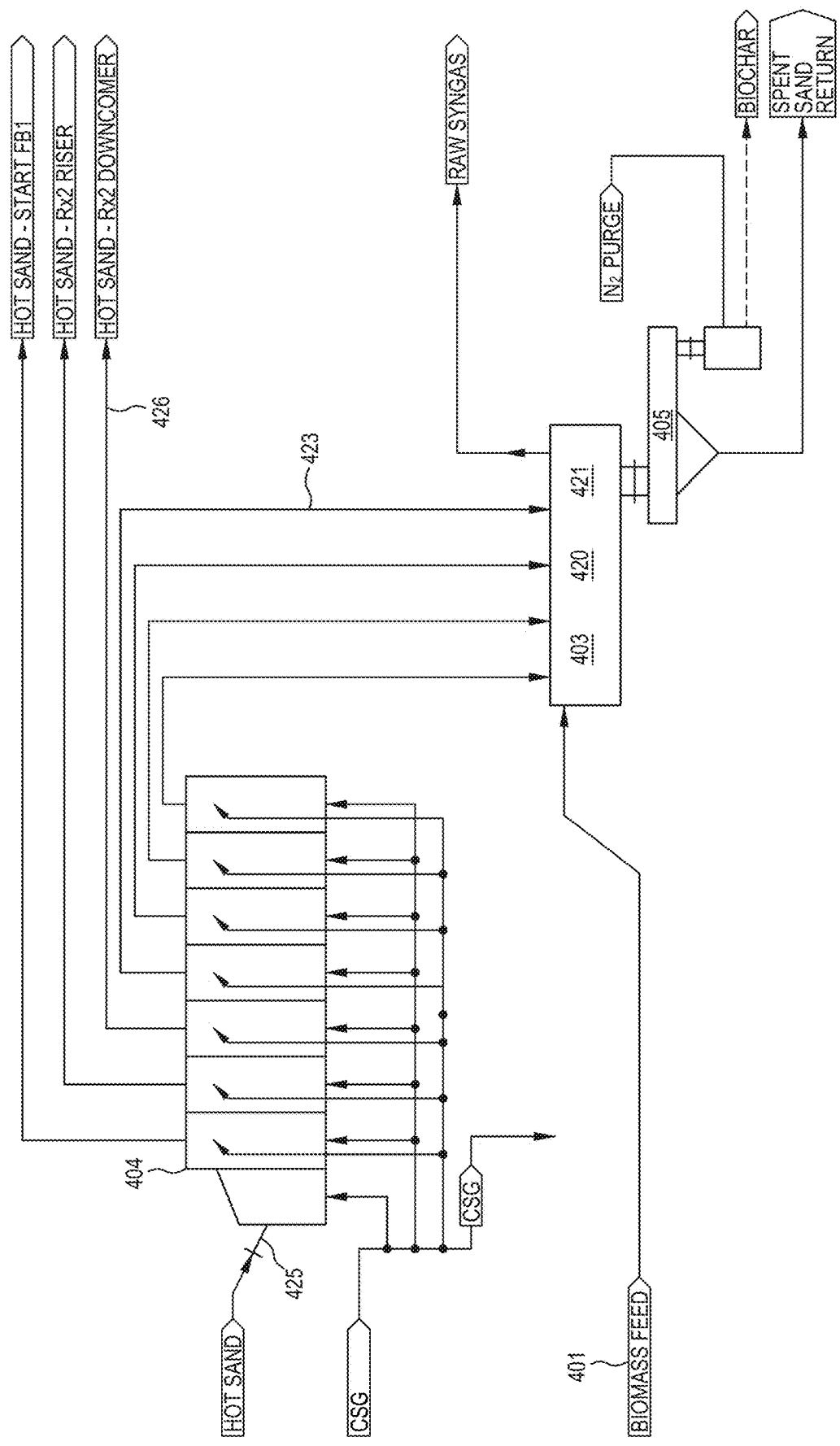
Figure 24:
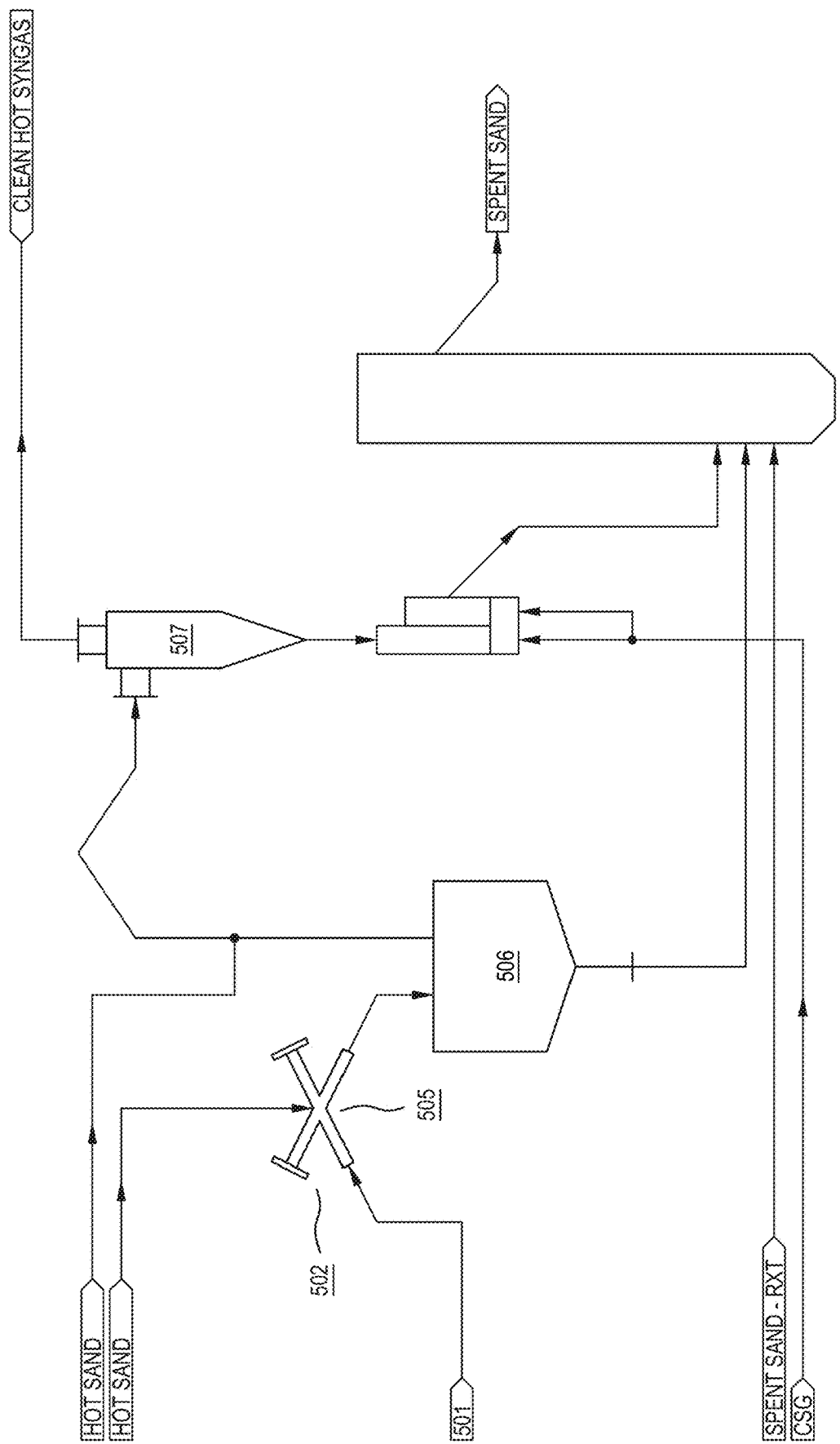
Figure 25:
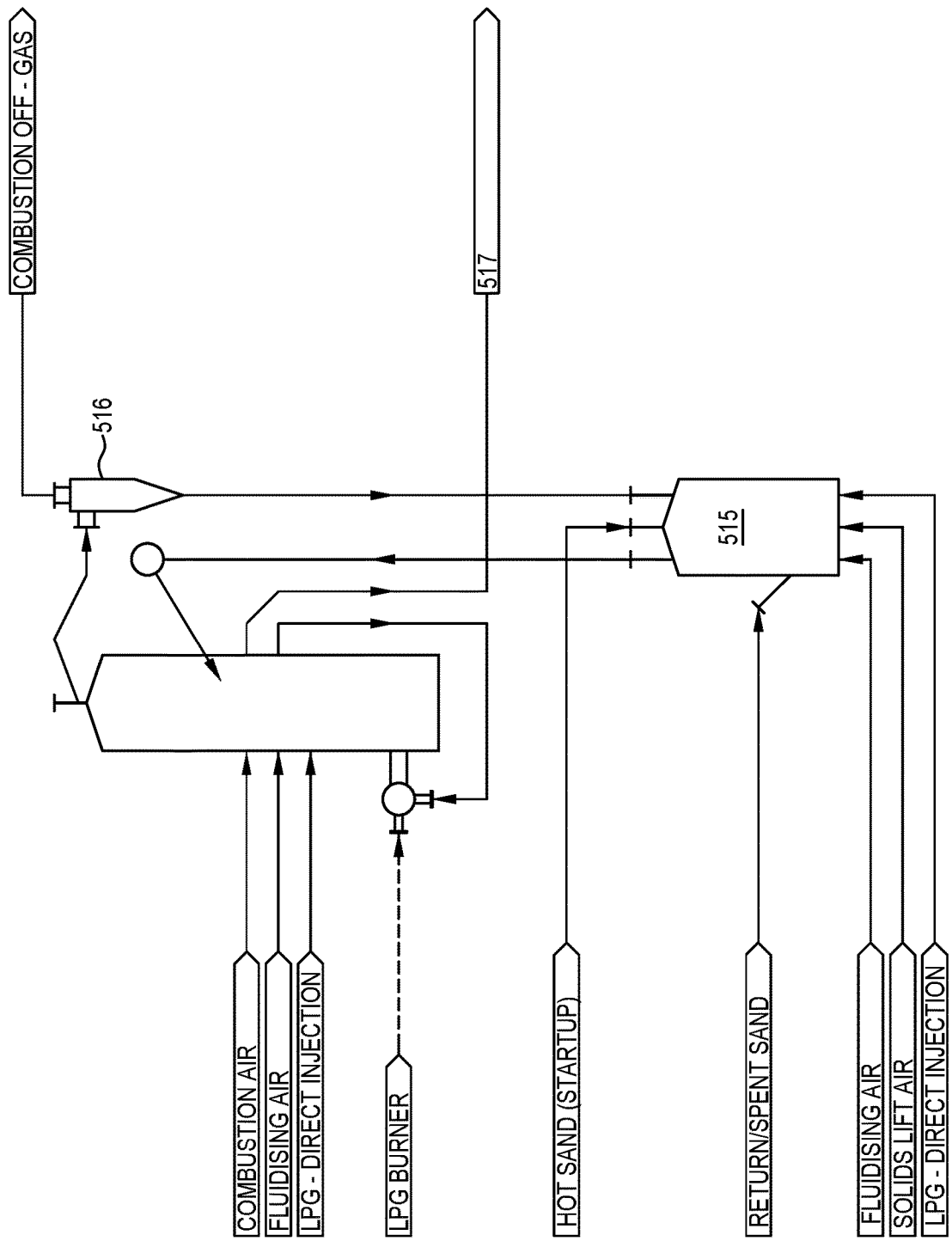
Figure 26:
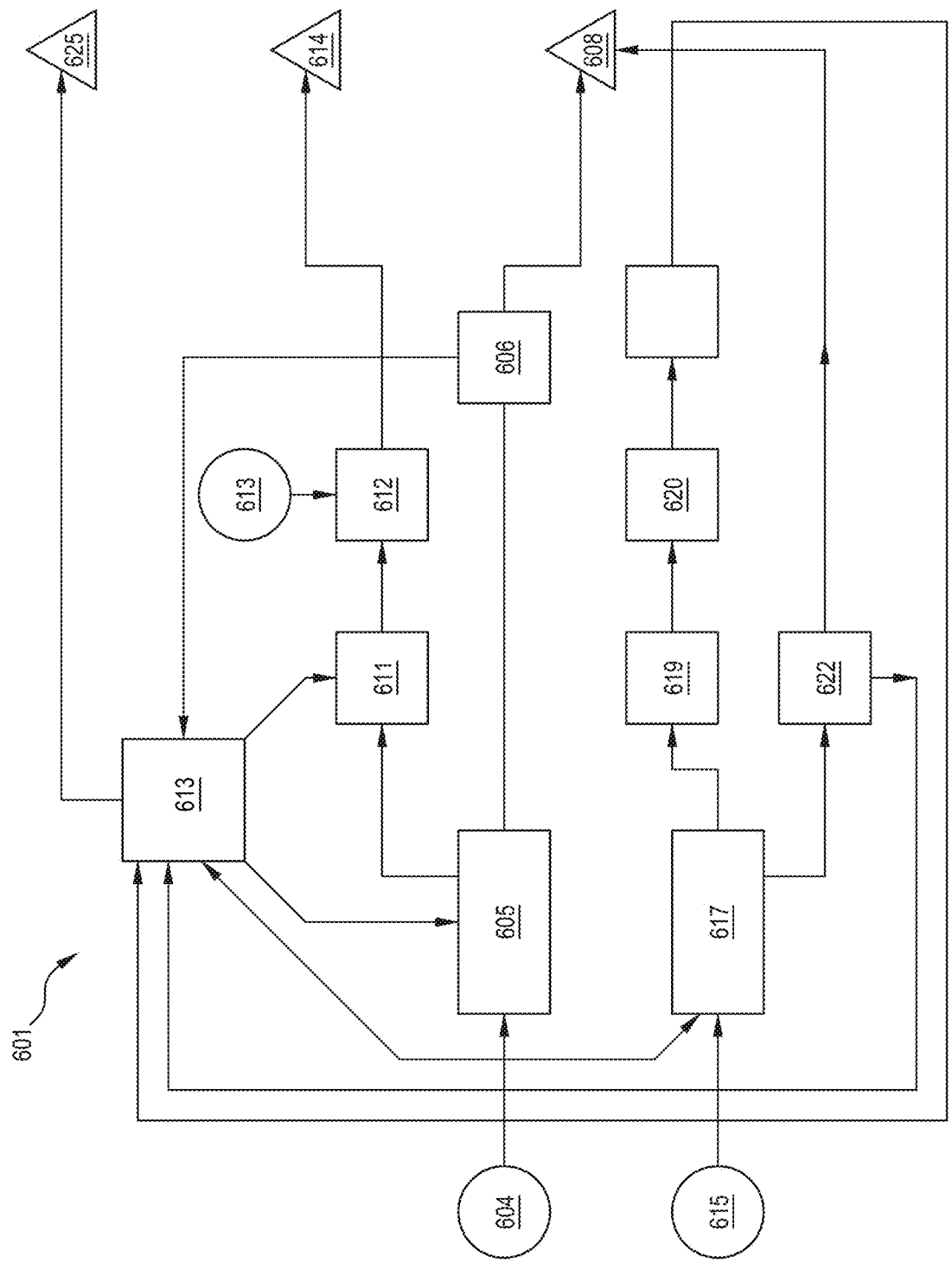
Figure 27:
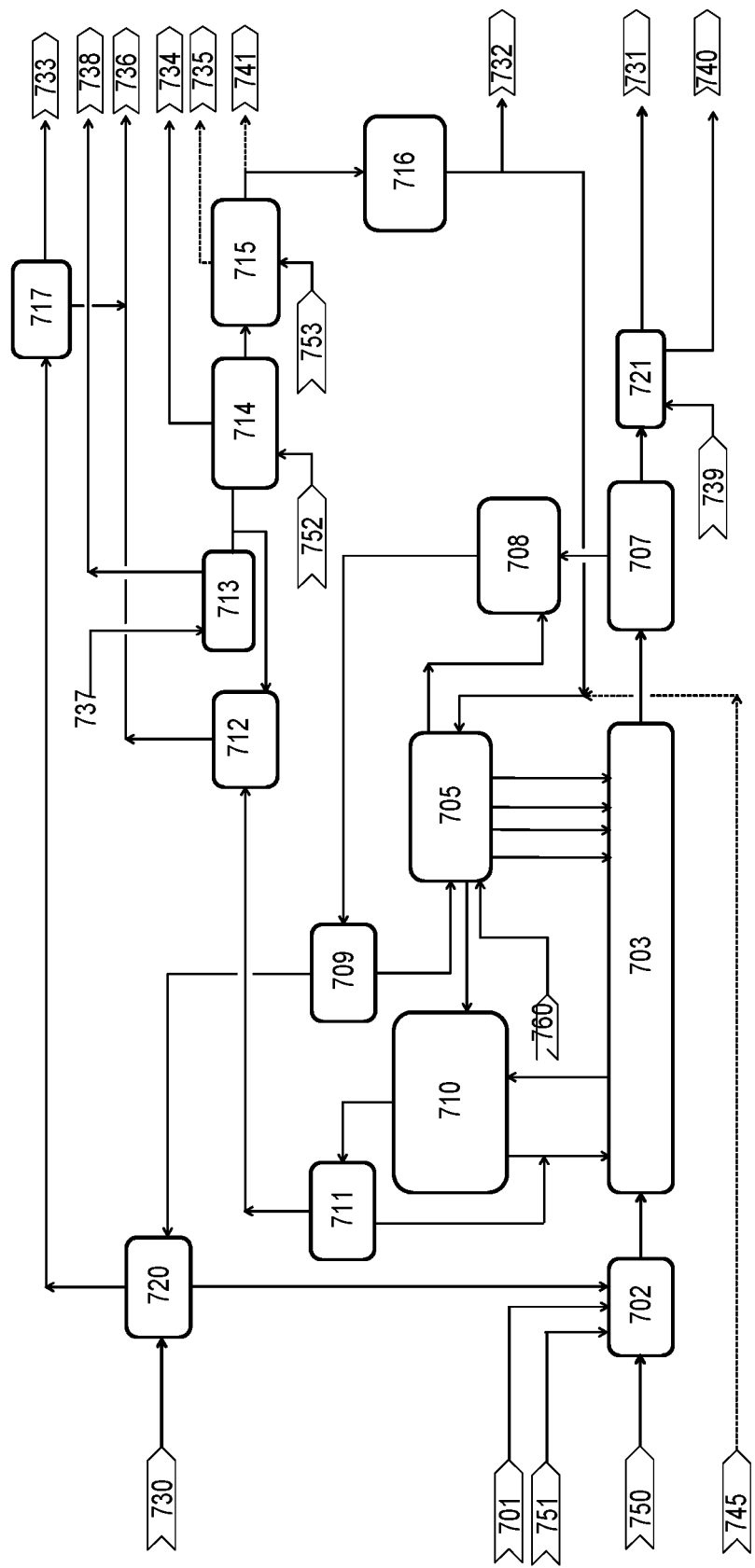

FIG. 6 shoes an isometric rear view of the distributor of FIG. 5;

FIG. 7 shows an isometric view of an elevator assembly of one embodiment of the disclosure;

FIG. 8 shows an isometric view of a fluid bed assembly of one embodiment of the disclosure;

FIG. 9 shows an isometric view of a gasification reactor of one embodiment of the disclosure;

FIG. 10 shows an isometric view of a reactor assembly of one embodiment of the disclosure;

FIG. 11 shows a separator assembly of one embodiment of the disclosure;

FIG. 12 shows a side view of an assembly of a further embodiment of the disclosure;

FIG. 13 shows a top view of the apparatus of FIG. 12;

FIG. 14 shows a side view of an apparatus of one embodiment of the disclosure;

FIG. 15 shows a front view of the apparatus of FIG. 14;

FIG. 16 shows a side view of the apparatus of FIG. 14;

FIG. 17 shows an isometric view of an embodiment of a reactor of one form of the disclosure;

FIG. 18 shows a top view of the reactor of FIG. 17;

FIG. 19 shows a side view of the reactor of FIG. 17;

FIG. 20 shows a simple flow chart of a process of one embodiment of the disclosure;

FIG. 21 shows a flow chart of a process of a second embodiment of the disclosure;

FIG. 22 shows a block flow diagram of one embodiment of a process of the disclosure;

FIG. 23 shows a block diagram of a sand distribution system and reactor of one embodiment of the disclosure;

FIG. 24 is a block diagram of a gasification system of one embodiment of the disclosure;

FIG. 25 is a block diagram of a combination of fluid beds for heating;

FIG. 26 is a block flow diagram of a further embodiment of the process;

FIG. 27 is a block flow diagram of a further embodiment of the process; and

Figure 28:
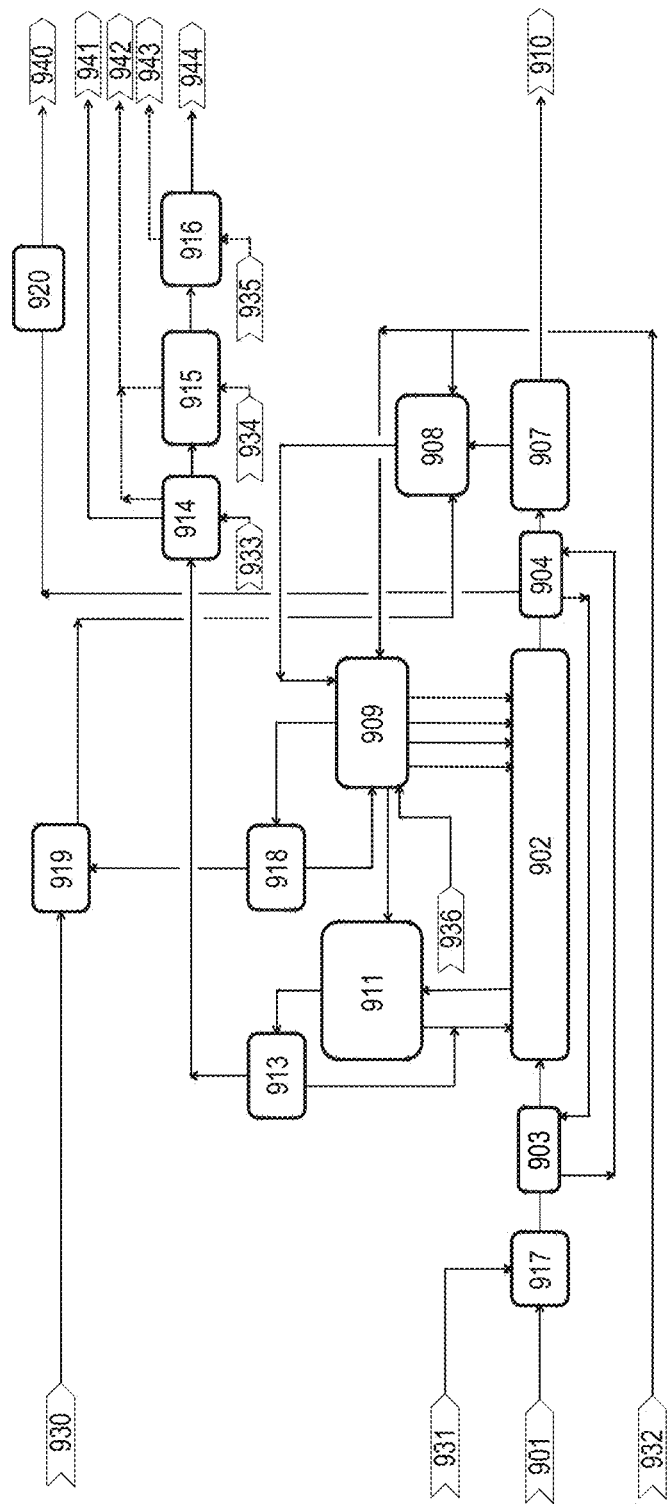

FIG. 28 is a block flow diagram of a further embodiment of the process.

DETAILED DESCRIPTION

According to a first aspect, disclosed is a process for processing carbonaceous material, the process comprising delivering a carbonaceous material to a reactor; delivering a catalyst to the reactor; processing the carbonaceous material at a relatively low temperature within the reactor to deconstruct the carbonaceous material to base compounds.

The process in some forms is based on direct heat transfer using hot solids. In some forms a free flowing sand like material is heated separately and then mixed together with the biomass or feedstock in the pyrolysis reactor. This method may have the advantage of supplying heat indirectly from the heat source (but directly to the biomass) without dilution of the syngas with nitrogen or carbon dioxide.

In some forms, the process further comprises recovering at least a portion of the catalyst from the output material and regenerating the catalyst for re-use in the process.

In some forms the output material includes biochar.

In some forms the catalyst comprises an iron oxide based catalyst. In some forms the catalyst comprises ilmenite.

In some forms the catalyst or heat transfer media can contain a reacting component or absorbent. In some forms the absorbent comprises calcium oxide.

In some forms the carbonaceous material comprises per and poly-fluoroalkyl compounds. In some forms the carbonaceous material comprises halide or halogenated compound contaminated organic material.

In some forms the process further comprises the step of recovering syngas from the output material of the reactor processing.

Also disclosed is a process of treating carbonaceous material, the process comprising treating carbonaceous material in a low temperature reactor in a reducing environment with an iron based catalyst.

Further, disclosed is an apparatus for processing carbonaceous material, the apparatus comprising a reactor vessel for processing carbonaceous material; an egress from the reactor vessel for moving an output material from the reactor vessel, the output material containing a biochar and a catalyst; a separation vessel for separating the biochar and at least a portion of the catalyst; at least one egress to deliver biochar to a biochar container; at least one egress to deliver at least a portion of the catalyst and any alternative material to a combustor; a fluid bed to receive at least a portion of the catalyst and any alternative material; a return to deliver at least a portion of the catalyst to the reactor.

The carbonaceous material may comprise contaminated organic material such as GAC or other waste organic material such as biomass, organic wastes, bio-solids from waste water treatment, waste streams from abattoirs or other organic businesses, contaminated soils and fossil fuels waste, for example. In some forms the contaminant is PFAS.

In some forms the process allows for secondary gasification of the oils and tars that are evolved from pyrolysis in a separate vessel which is also heated with hot sand. This may have the benefit of no waste steams to deal with or resultant "bad" odours.

Heat transfer is achieved using a free-flowing solid material, i.e. sand like material that is recirculated between a fluid bed at 950° C. or a similar temperature and the pyrolysis unit operating at an exit temperature of about 50° C. An example of the heat transfer media that may be used is ilmenite.

Using this method of heat transfer allows a high calorific syngas to be co-produced as there is no dilution with atmospheric nitrogen. The raw syngas from pyrolysis is "super-heated" in a separate vessel using more hot sand to decompose (gasify) any residual tars and oils; or further decompose any halide organic compounds liberated from the first stage, hence a clean syngas is produced without any of the usual tars, oils or hazardous wastes to dispose of or deal with. This also lowers the general plant odours and fugitive emissions. About 30% of the syngas is used to heat the fluid bed with the excess available for heating or power generation.

Waste heat from the fluid bed is used to dry the incoming biomass feedstock, thereby achieving high overall thermal efficiency. The final off-gas is wet scrubbed to remove particulate matter and water soluble components.

The reactor may include multiple points of hot sand injection into the reactor which may have the benefit of providing controlled slow autogenous pyrolysis which provides maximum temperature control for improved yield of char, syngas and removal of contaminates. In some forms a hot sand distribution assembly is used which delivers hot sand to a series of spaced apart inputs in the reactor. The hot sand distribution assembly may comprise a single hot sand input and a plurality of outputs which may be controlled through adding sufficient fluidised air to decrease the density in a riser chamber and move the hot sand into the plurality of outputs.

The reactor may in some forms use a catalytic sand material or thermal treatment of minerals to provide an additional product stream.

In some forms the reactor is mechanically agitated to achieve good mixing, even temperature, good residence time control and avoid blockages. Partial fluidisation with recycling of a portion of the syngas can assist temperature control and material movement through the reactor and enhance resultant biochar properties. The process may have the benefit that scale-up of the pyrolysis reactor is only limited by mechanical design—not heat transfer area.

Recycling of the spent sand may be achieved using special elevators or pneumatic transfer without requiring the sand to be cooled.

Waste energy from re-heating of the sand may in some forms be used to dry the incoming biomass feed which maximises the thermal efficiency and increases the syngas quality.

The advantages of this technology may include:
High energy efficiency, as all waste heat is utilised for pre-drying of the feed biomass and/or combustion air pre-heating
High yield of biochar due to favourable reactor conditions (slow pyrolysis)
Control of the biochar properties (to allow sale to different applications)
Some oils and tars will be present in the raw syngas, which is treated in a separate gasifier reactor, also using hot sand, to convert these oils and tars to more syngas, therefore no by-products to deal with and no odours.
Pyrolysis gas is not diluted by any inert gas or combustion products.
Good steady state control of process conditions, temperature, residence time with no hot or cold spots, therefore more consistent product quality.
Able to process a wide range of feedstocks types and sizes without risk of plugging gas flows or blockage
Easy start-up and shut-down (no consequence if the plant needs to be stop suddenly, i.e. oil and tar condensation in pipework)
Simple/easy to maintain equipment
Can use catalytic materials to assist pyrolysis and lower emissions
Part of the product biochar may be utilised for syngas cleaning (like activated carbon) and then returned to the system for treatment
Safe operation, low fugitive emissions In some forms, the system may have the benefit of using a fifth or even a tenth as much length in a reactor.

The syngas output may be clean and clear of nitrogen as no nitrogen is added to the system.

Figure 1:
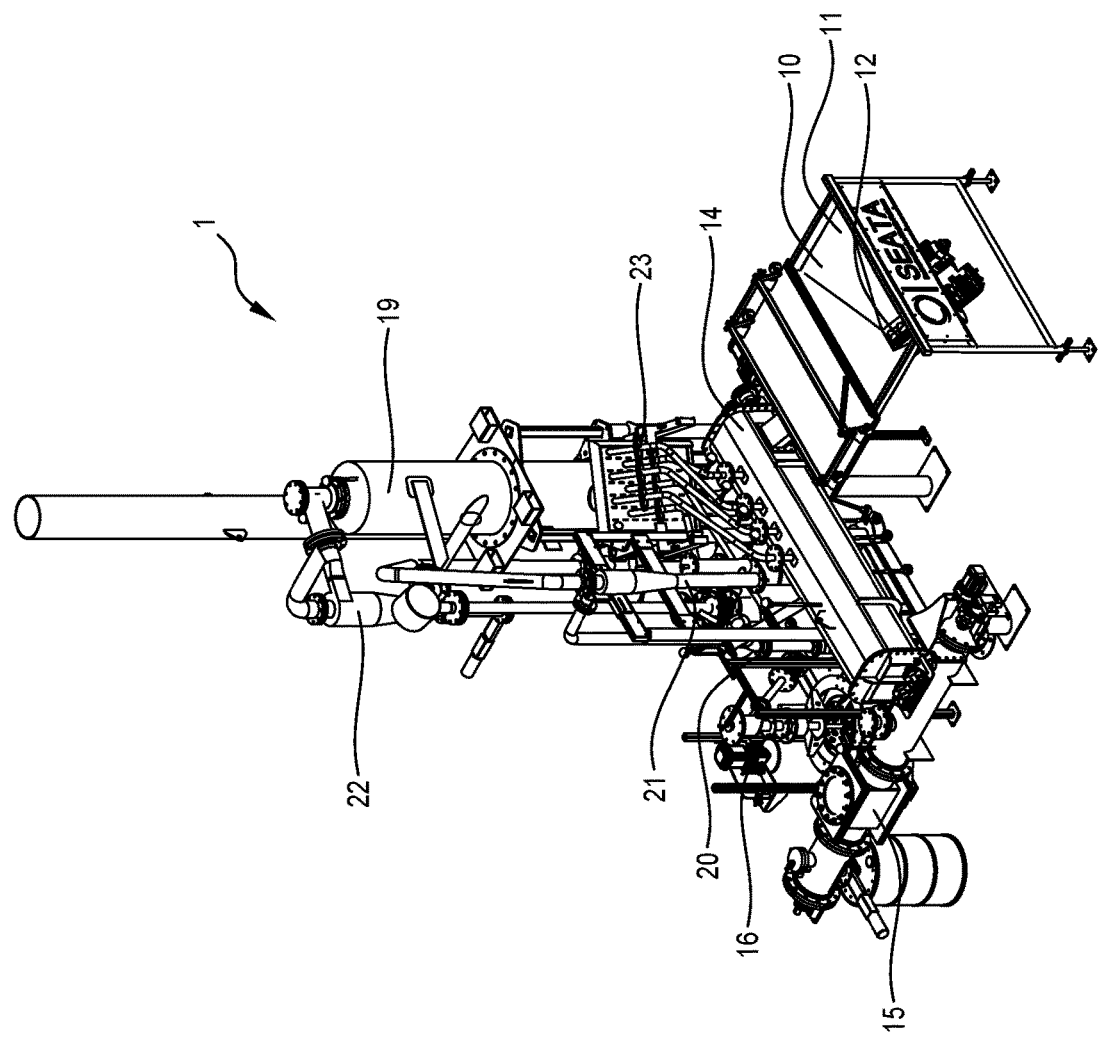
FIG. 1 shows an isometric front view of a processing system of one embodiment of the disclosure.
Figure 2:
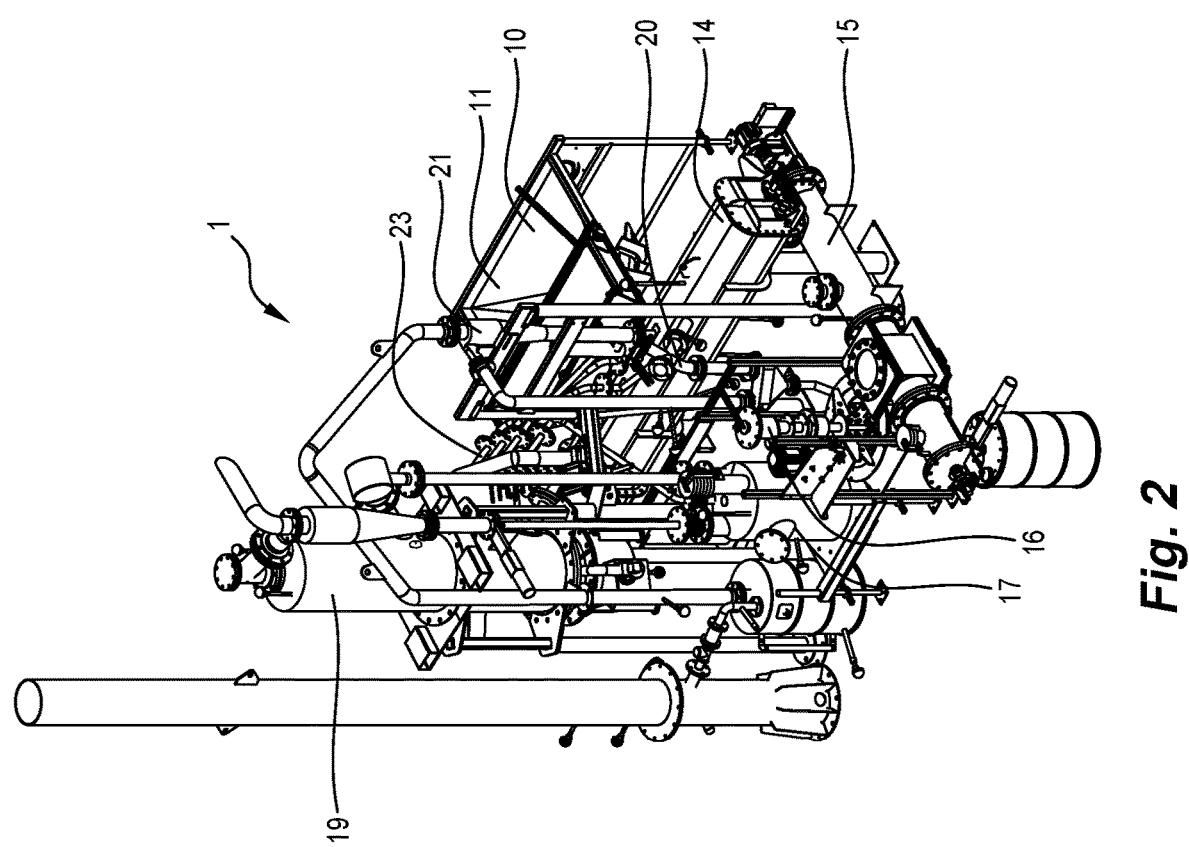
FIG. 2 shows an isometric rear view of the embodiment of FIG. 1.

Referring now to the Figures, FIGS. 1 and 2 show a reactor assembly 1 of one embodiment of the disclosure.

In the assembly 1 a materials feeder 10 comprising a delivery chute 11 and a screw feed 12 delivers biomass or other materials for treatment in the assembly 1. The screw feeder 12 extends into a primary pyrolysis reactor 14 and provides a gas seal to limit reverse flow of syngas from the reactor. The reactor extends longitudinally. The material is processed in the primary reactor 14 and treated material is moved from the primary pyrolytic reactor 14 to a separator 15.

Spent sand and biochar is separated by the separator 15 and spent sand moves through an elevator 16 to a combustor riser 17 and to a fluid bed 19. Off-gas from fluid bed 19 passes to cyclone 22. From the primary reactor 14 the syngas is moved to a secondary gasification reactor 20 via a syngas cyclone 21.

Both the primary and secondary reactors 14 and 20 are fed sand in the form of ilmenite or alternative fine hot sand from sand distribution system 23.

Figure 3:
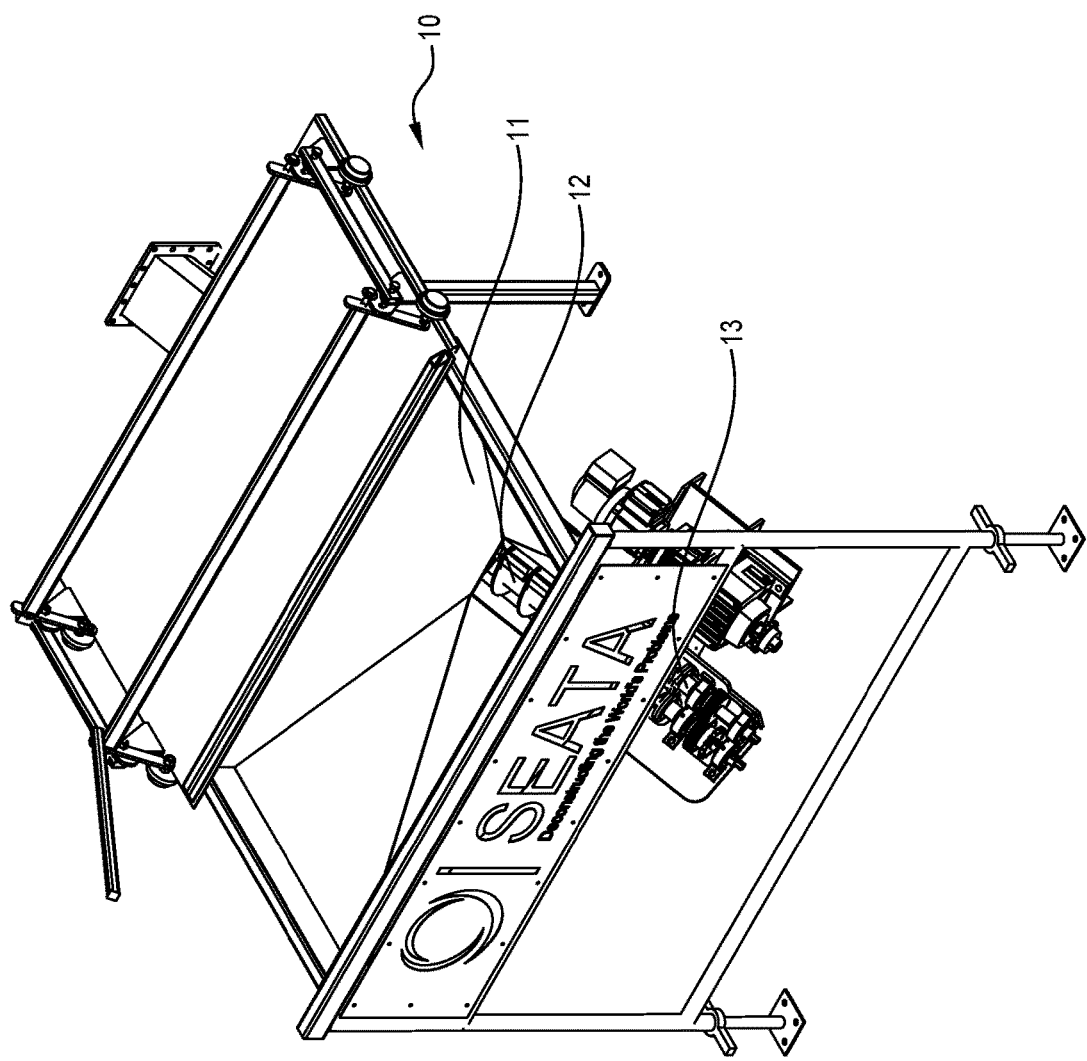
FIG. 3 shows an isometric view of a feeder assembly of one embodiment of the disclosure.

Referring now to FIG. 3, the materials feeder 10 comprises a delivery chute 11 and a screw feed 12 located to receive the materials. The delivery chute 11 can be closed using a sliding lid, or in any other manner.

The screw feed 12 comprises a sloped tube extending upwardly. In the illustrated form the screw feed 12 is angled at between approximately 10 degrees and 45 degrees to the horizontal. This may have the benefit of avoiding reverse combustion of biomass. A chain drive or other system connects motors to the rotating twin screw 13 located within the screw feed. The rotating screw 13 rotates to deliver biomass to the reactor at a controlled rate. In some forms the rate may be controlled manually to provide the reactor with an average outlet temperature. An upper end of the screw feed no longer includes the screw shape to allow for plug formation to limit the reverse flow of raw syngas. Biomass is fed from the screw feed 12 to the primary reactor 14. In some forms cold sand or ilmenite is also added to the materials feeder 10 as required based on the fluid bed level way of make-up.

Figure 4:
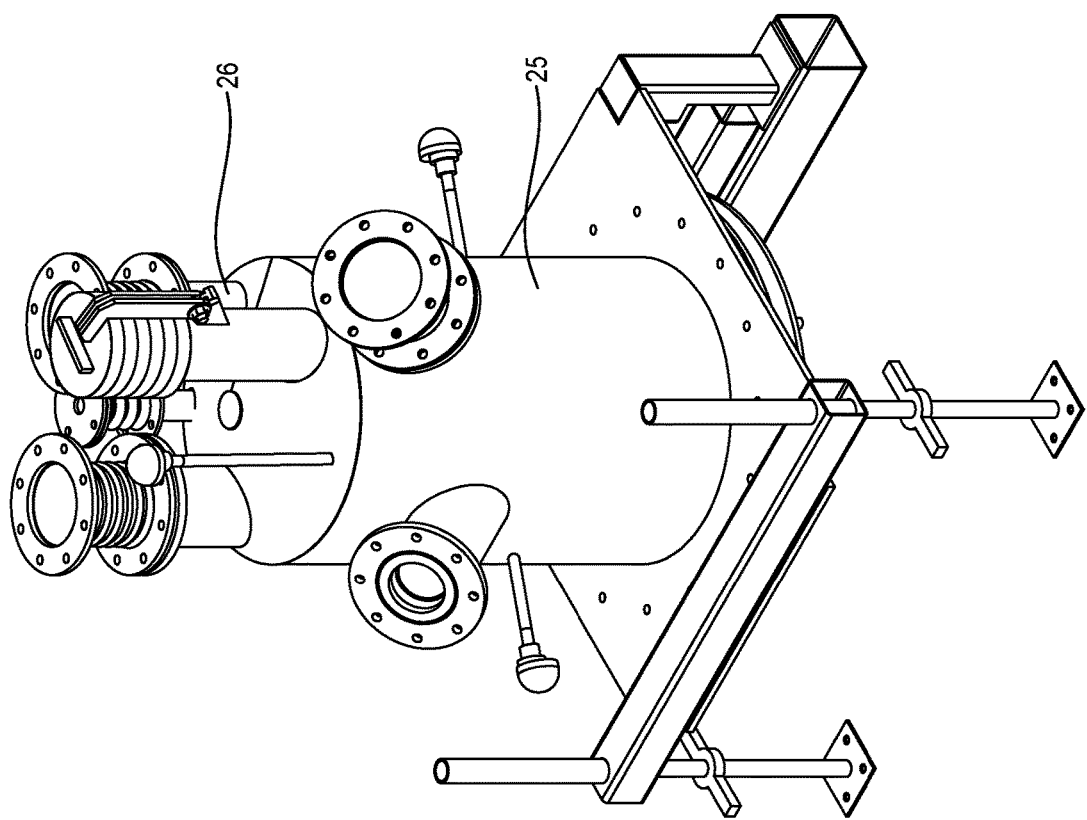
FIG. 4 shows an isometric view of a combustor riser assembly of one embodiment of the disclosure.

Referring to FIG. 4, the combustor riser in the illustrated form comprises a generally cylindrical upright combustion vessel 25 and a plurality of outlets 26. The waste heat from the fluid bed 19 may be utilised to preheat return sand or in situ combustion of fuels to provide heat or alternatives Referring now to FIGS. 5 and 6, the sand distribution system 23 comprises a single input and a plurality of outputs 27 controlled by non-mechanical valves. In alternative embodiments large scale mechanical valves may be utilised. In some forms the delivery of hot sand is manually controlled in response to the heat in a given zone of the reactor. In alternative embodiments this could be automated. The control of the sand moving to the outputs is actuated through the amount of fluidised air being delivered to a given area of the distribution assembly which results in movement of the sand to a given output. The hot sand is distributed from the distribution system 23 to the primary reactor 14, the secondary reactor 20 and the combustor riser as needed (start-up only). The output can be controlled by controlling the input manually, or the output can be automated through controlling the input.

Referring to FIG. 7, the elevator 16 comprises an elevator with a gas lock between the oxidation and reduction systems. The fluid bed vessel is shown in FIG. 8.

Referring to FIG. 9, the secondary reactor comprises a vessel 30 in which hot sand may be mixed with incoming syngas. In the illustrated form a dual angled tube 31 meets at an angle. A further v shaped funnel vessel 32 allows for mixing. Hot sand and syngas are mixed within the reactor and the reactor interior is sufficiently hot to gasify residual oils and tars from the syngas. This has the benefit of reducing clogging of the system. In alternative embodiments a series of risers and cyclones may be used. The intent is not to have the syngas passing through areas where it can cause a blockage. Syngas must be heated to greater than 850° C. on exit.

Referring to FIG. 10, the primary reactor comprises an elongate vessel 50 extending from an input end 51 where material from the feeder is fed into the reactor. The vessel 50 extends past a plurality of ingresses 53 which in the illustrated form allows ingress of hot sand from the hot sand distribution system. This divides the reactor into reaction zones. A double shaft paddle wheel auger located within the reactor vessel 50 rotates to mix the biomass fed from the feeder with hot sand.

In some forms constant measurement of the temperature allows the input of hot sand and biomass to be controlled. In some forms a residence time is allowed for by altering the paddles' shape or rotational speed at an output end of the reactor. Material from the reactors is then moved to the separator. In some forms, the reaction stages are separate mixers and may comprise independent separation of spent sand.

Referring to FIG. 11, the separator may comprise a separator vessel 58 incorporating one or more screens of varying types or apertures. Magnetic separation and physical separation may be used.

Further, turning to FIGS. 12 through 16, disclosed is a further embodiment of an apparatus for treatment of carbonaceous material. The apparatus 200 comprises an infeed 201 for ingress of carbonaceous material into a reactor 202. The reactor may be a pyrolytic reactor. Product from the reactor 202 is moved into the separator 203 wherein material is separated. Make-up ilmenite may be added at this point. Catalyst such as ilmenite then proceeds into the combustor riser 204 where it is raised to the fluid bed 205 and may be recovered and returned to the reactor to catalyse a further reaction in the reactor. Biochar is separated into a biochar bin 206. The combustor riser 204 comprises a cylindrical combustion vessel 208 and an upwardly extending pipe 209 which leads to a cyclone 210 connected with the fluid bed 205. The process of separation involves removing syngas from the reactor 202 to the tar cracker and then to the water quench/scrubber. Excess syngas is flared via a stack 205.

Turning to FIGS. 17 to 19, disclosed is a reaction vessel comprising a plurality of mixing zones. The mixing zones are located and set via hot solids ingress points. The zones provide temperature control. The reaction vessel further includes ploughs to improve fluidisation. The reactor 202 extends from an infeed 284 through an auger 285 to a discharge 286. The infeed comprises an entry conduit 288 and augur 285 to direct material to the reactor body 270. The reactor body 270 includes a mechanically assisted fluidised bed/mixer 273 which is composed in the illustrated form of a twin shaft 274 with paddles that may be angled to assist or retard flow.

Once material enters through the infeed 284, raw syngas may exit at a syngas discharge 275. Hot sand or alternative material is injected at a plurality of hot solids ingress points 277. This creates zones within the reactor 202.

Turning now to FIG. 20, shown is a simple flow chart of one embodiment of the disclosure. The illustrated process 301 of treating a carbonaceous material 302 comprises the step of delivering the carbonaceous material 302 to a reactor 303.

The process further includes introducing fuel 306, air 307 and a catalyst 308 to the reactor. The fuel may consist of any commercially available clean burning gaseous or liquid hydrocarbon fuel or solid fuels such as biomass, coal or char. In some forms the fuel may be syngas. The catalyst may be in the form of an iron oxide catalyst, such as for example, ilmenite. The fuel 306 air 307 and catalyst 308 may be delivered to a fluid bed 311 which includes an egress to the reactor 303. Combustion off-gas 309 is removed from the fluid bed. The organic material 302, and hot catalyst 308 meet in the reactor 303.

The reactor 303 may in some forms comprise a pyrolytic reactor which acts to partially combust the organic material by contact with a heated solid medium. In some forms the heated solid medium includes ilmenite. In some forms the reactor may be configured to put the organic material through several steps of heating. In the illustrated form the heating steps are maintained at a relatively low temperature of 500 to 900° C.

The products of the reactor are delivered from the reactor to a separating chamber 310 where clean material 312 and recoverable material are separated from one another, The clean material 312 proceeds through an egress while the recovered material is delivered to the fluid bed 311 where it can be delivered to the reactor 303. In some forms the recovered material comprises at least some of a spent catalyst and a fuel. In some forms the separator comprises screening. A portion of the spent catalyst maybe rejected to maintain catalyst integrity.

Material further proceeds from both the reactor and the fluid bed to at least one scrubber. In the illustrated form the gaseous material proceeds through a dry scrubber 314, where secondary gasification occurs and on to a wet scrubber 315. A neutralising agent 317 such as, for example, CaCO3 may be added to the wet scrubber 315. Clean-off gas 318 and precipitated solids 319 are removed from the wet scrubber.

The process has the benefit of treating contaminated organic materials, in particular halide contaminated, at a relatively low temperature and thus requiring lower energy input than prior art systems. By keeping the reaction temperature below approximately 900° C. the temperature is kept relatively low compared to other systems that require >1100° C. In addition, the process utilises ilmenite as a medium, which provides heat transfer and a catalyst. The process in some forms may allow release at approximately 500° C. and destruction of volatilised contaminants at approximately 1000° C. while recovering and in some forms reactivating carbon. In some forms the system may allow for recovery of the catalyst in order to re-use at least a portion of the catalyst.

Turning now to FIG. 21, a second embodiment of a process for the treatment of a carbonaceous material is disclosed. The process comprises delivering carbonaceous material 321 to a reactor 322 via a drier 323. The drier may in some forms utilise standard process equipment including an off-gas cyclone 325 which is further connected to a drier wet scrubber 344. Make up water 360 is sent to the wet scrubber 344 to scrub the incoming off-gas and the spent (i.e.

treated) water 361 is output from the wet scrubber while the treated off-gas 352 may be disposed of suitably.

Within the reactor 322, the material undergoes heating at a temperature greater than 200° C. to initiate torrefaction at a temperature greater than 300° C. and finally pyrolysis at a temperature of greater than 500° C. In some forms the temperature of the reactor remains lower than 800° C. to 900° C.

The process further may include delivering fuel, which may be in the form of syngas, and a catalyst, which may be in the form of an iron oxide catalyst such as ilmenite, to the reactor 322 by way of a fluid bed 327, a primary scrubber 328 (this is the same as the dry scrubber described above), a riser 330 and a plurality of cyclones including a riser cyclone 331, a fluid bed off-gas cyclone 332 and a syngas cyclone 333. Air 350 may be preheated in a heat exchanger 345 and fed to the riser 330. The heat exchanger 345 may in turn be preheated by hot syngas output by the syngas cyclone 333. Cooled syngas is sent to a syngas wet scrubber 346 and scrubbed using water 363 input to the scrubber 346. Part of the syngas coming out from the wet scrubber 346 may be used as fuel with the excess syngas 353 being taken off. Treated water 365 from the wet syngas scrubber may be disposed of suitably.

After processing in the reactor 322, material is delivered to a separation chamber 335. The separation chamber may in some forms comprise a rotating screen or alternative separator. Material from the separation chamber is delivered to an anaerobic cooler 342/343 and material including biochar 336, some roasted mineral catalyst 337 and cooling water 338. Material such as mineral/heat transfer media or catalyst is moved through a riser 340 to riser cyclone 331 and to the fluid bed 327.

Referring to FIG. 22, disclosed is a process of treating a carbonaceous material. The process comprises feeding biomass 401 into a feeder 402 comprising a twin screw feeder and delivering the biomass to a primary reactor 403. The primary reactor in the illustrated form comprises a double shaft paddle wheel within a vessel. The reactor may increase the heat of the biomass through 160° C. to 300° C. to 500° C.

Hot sand or ilmenite is delivered to the reactor 403 from a hot sand distribution assembly 404. The hot sand is delivered at a plurality of inputs which effectively divides the reactor into zones having differing temperatures. The double shaft paddle wheel mixes the biomass with the sand. Regular temperature measurement allows for controlled delivery of sand from the hot sand distribution assembly.

In some forms the hot sand is a catalyst such as ilmenite or an alternative iron based catalyst.

Raw syngas is released from the primary reactor and delivered to a secondary reactor 410 for syngas gasification. This continues to heat the off gas and break the tars and oils down into smaller molecular weight components to reduce the condensation and blockage by oils and tars. Clean syngas is released to a compressor and may be flared, released or re-used as a fuel.

A key objective of the plant may be to determine the syngas composition.

The treated biomass is delivered to a separator which may include a plurality of screens to separate the biochar products and roasted sand from the flow. Nitrogen may also be purged from the separator. Material continues from the separator to an olds elevator 406 and then into a combustor riser 407. The combustor riser in the illustrated form increases the temperature to 750° C. Air is injected to control the lift rate.

The material is moved to a fluid bed 411 which may be at greater than 900° C. A plurality of cyclones are used to separate the off gas from material for further treatment.

Referring to FIG. 23, more detail of the pyrolysis in the primary reactor 403 is shown. Biomass feed 401 is delivered to the primary reactor 403. Within the primary reactor vessel 420 is a double shaft paddle wheel 421 which mixes the biomass with hot sand catalyst within the reactor. The hot sand catalyst is delivered from a hot sand distribution system 404 which comprises a plurality of non mechanical valves actuated either manually or automatically in response to temperature measurement within the reactor.

The hot sand catalyst is delivered from the distributor assembly 404 via a series of tubes 423 to various zones of the reactor 403. The reactor is divided loosely into several zones. In the illustrated form the zones comprise a heating zone, a torrefaction zone, a pyrolysis zone and an autogenous zone. These are defined by the input of hot sand. The temperature of the zones indicates when additional hot sand is required from the multi-vessel hot sand distribution system 403. The hot sand distribution system in some forms has a single input 425 and multiple outputs. In the illustrated form the multiple outputs comprise 7 outputs. Four outputs deliver hot sand to the primary pyrolysis reactor 403 while the other three outputs 426 deliver hot sand to the secondary reactor and the fluid bed in the remainder of the treatment system.

Material from the primary reactor is delivered to the separator 405 and separated to return to the reactor, to be released as biochar or spent sand.

Referring to FIG. 24, more detail of the secondary reactor and gasification of syngas is shown. Raw syngas 501 from the primary reactor is delivered to a secondary reactor 502. The secondary reactor in the illustrated form is shaped as a dual angled tube meeting at an angle. Hot sand and syngas are mixed within the reactor and the reactor interior is sufficiently hot to gasify residual oils and tars from the syngas. This has the benefit of reducing clogging of the system. A diverter valve 505 is included at the meeting point of the dual tubes of the reactor to allow alteration of the direction of hot sand flow. The material proceeds into a funnel vessel 506 and into a syngas cyclone 507.

FIG. 25 shows a block diagram of a combination of fluid beds for heating sand. The fluid beds comprise a first fluid bed 515 and second fluid bed 516. Hot sand from the hot sand distribution assembly is delivered to the first fluid bed 515. Fluidising air, solids and fuel are added and the fluid bed heats to approximately 750° C. Material flows to the second fluid bed and combustion air fluidising air and fuel are added. The temperature is increased to approximately 950° C. Hot sand is delivered via a delivery tube 517 to the distribution system while combustion off gas is expelled.

EXAMPLES

Table 1 shows exemplary feedstock and temperatures for reaction along with a percentage yield to biochar.

| Feedstock | Source/size | Temperature ° C. | Yield of solids (to char) (dry feed basis*) mass % |
|---|---|---|---|
| Woodchip | eucalyptus trees/ | 450 | 25.3 |
| | Invasive Native | 500 | 21.4 |

-continued

| Feedstock | Source/size | Temperature ° C. | Yield of solids (to char) (dry feed basis*) mass % |
|---|---|---|---|
| | Scrub (INS) | 700 | 13.3 |
| | −25 mm particles | 800 | 12.9 |
| Straw | Oaten hay, chaff | 400 | 19.9 |
| Lignite coal | Morwell, Vic, Aust. −12 mm particles | 700 | 53.2 |
| Chicken Manure (including saw dust & dirt) | Hunter valley as received −20 mm | 500 | 69.2 |
| Bone chip | Abattoir 'as received' −20 mm | 500 | 33.9 |
| Paunch (partly composted) | Abattoir 'as received' | 450 | 46.3 |
| Bio solids (filter cake) | From waste water treatment, Hunter Valley region | 450 | 49.5 |

Example 2

Further test work was completed in which the residence time was 15 minutes and operating pressure was atmospheric.

In some forms the residence time is up to 1 hour. In some forms the temperature of the pyrolysis is between approximately 600° C. and approximately 900° C. In some forms a final deconstruction step (either in a primary or dry scrubber) may operate at between approximately 750 and 1000° C. In some forms the temperature of the final deconstructions step is approximately 800° C.

As shown in table 2, the solid results of PFAS treatment confirms removal of the PFAS compounds at a low operating temperature.

TABLE 2

| EP231P: PFAS Sums | | | 'as received' GAC | 850° C. | 950° C. |
|---|---|---|---|---|---|
| Sum of PFAS | | mg/kg | 0.0002 | 0.804 | <0.0002<0.0002 |
| Sum of PFHxS and PFOS | 355-46-4/ 1763-23-1 | mg/kg | 0.0002 | 0.699 | <0.0002<0.0002 |
| Sum of PFAS (WA DER List) | | mg/kg | 0.0002 | 0.756 | <0.0002<0.0002 |

Table 3 shows water samples from the off-gas scrubber:

TABLE 3

| EP231P: PFAS Sums | | | Start 850° C. run | Finish 850° C. run | Start 950° C. run | Finish 950° C. run |
|---|---|---|---|---|---|---|
| Sum of PFAS | | µg/L | 0.01 | <0.01 | <0.01 | <0.01 | <0.01 |
| Sum of PFHxS and PFOS | 355-46-4/ 1763-23-1 | µg/L | 0.01 | <0.01 | <0.01 | <0.01 | <0.01 |
| Sum of PFAS (WA DER List) | | µg/L | 0.01 | <0.01 | <0.01 | <0.01 | <0.01 |

These results indicates that the PFAS compounds have been thermally devolatalised, at a much lower temperature than might have been anticipated, followed by full thermal destruction of only the contaminant fraction.

FIG. 26 shows a flow chart plan of a further embodiment of a process for treating more than one type or stream of carbonaceous material in parallel. The system allows for two separate feeders and two separate reactors but includes a single source of hot sand that can be taken from for each reactor system. In the illustrated process 601, a first stream of contaminated material in the form of carbonaceous material 604 is delivered to a first reactor 605. Treated material from first reactor 605 flows outwardly from the first reactor 605 in two channels. A first is screened at first screen 606 and output as treated material 608. During screening at first screen 606, material impeded by the first screen 606 is delivered to a common fluid bed 613 for further treatment.

A second flow of material is delivered to a second reactor 611, reacted and delivered to a scrubber 612. Additional substances 613 in the form of CaCO3 are delivered to the scrubber 612. The output of 612 is released at release point 614 as clean off-gas.

A second stream of material in the form of biomass 615 is delivered to a third reactor 617. From the third reactor 617 material is delivered to either a fourth reactor 619 or a second screen 622. The reactor output is screened at second screen 622 and output as treated material 608. During screening at second screen 622, material impeded by the second screen 622 is delivered to the common fluid bed 613 as biochar fuel.

Output delivered to fourth reactor 619 is processed through a second scrubber 620 and returned to the common fluid bed as clean syngas fuel.

The common fluid bed outputs spent combustion off-gas 625 and allows hot sand to flow to the four reactors.

The screens may be in the form of magnetic separators or physical screens or any other screen system.

The technological advantages of the system are providing a common fluid bed for both contaminated material treatment and biomass treatment. Biomass is converted to syngas for fuel and to biochar for fuel or soil additive or carbon sequestration which is sized according to needs. Gas streams from different feed stocks will not mix allowing delivery of clean syngas.

A further embodiment of the system is shown in FIG. 27. Feed material such as biochar 701, biosolids 750, make-up media 751 and biosolids 730 processed through a sizing and drying unit 720 is delivered to a mixing and feed system 702 and into a primary reactor 703. The primary reactor treats the material with pyrolysis at 500 to 700° C. via mixing with hot media such as hot catalytic sand. The reactor also includes four zones or stages through which the material moves. The hot media is delivered to the reactor 703 from a fluid bed 705 via a delivery system. Start-up of back-up fuel supply 745 may be used to start up the fluid bed initially. Air 760 may be added to the fluid bed 705.

Treated material from the reactor 703 is moved to a separator 707 which includes one or more screens. Biochar separated from the separator can be sent to an anaerobic cooler 721 cooled by water 739 input to it. Dry biochar product 731 obtained from the anaerobic cooler is released while warm water 740 output from the anaerobic cooler can be used for heating purposes. The return media obtained from the separator 707 is returned via a preheater/riser 708 to a fluid bed off-gas cyclone 709 and the fluid bed 705.

Raw syngas from the reactor 703 is delivered to a secondary reactor 709710 for gasification of volatile hydrocarbons at approximately 900° C. Once gasified and separated through a cyclone 711, the outflow (i.e. syngas, off-gas and other products) may be sent through a series of scrubbers (712, 714 and 715), filters 717 and heat exchangers 713 such that off gas 733, warm water 738, recovered water 734, solids 736, spent biochar 735 may be released or flared 741. Cooling water 737, reagents 752 and coarse Biochar 753 may also be added during various steps of the treatment. Clean syngas can be sent to syngas compression and storage unit 716 and excess clean syngas 732 may be sent for other uses.

A further embodiment of the process is shown in FIG. 28. In the embodiment contaminated soil 901 or GAC is delivered via a feed system 917 to a primary reactor 902 for thermal desorption of PFAS at 500 to 700° C. A heat exchanger 903 and anaerobic cooler 904 are used to exchange heat.

Spent sand and clean soil 910 is separated by the separator 907 through screen and magnetic separation and spent sand moves through a combustor riser 908 and to a fluid bed 909. Clean soil 910 is released as a product Off-gas from fluid bed 909 passes to cyclone 918 and a heat exchanger 919. The heat exchanger can be used to heat air 930 that is supplied to the combustor riser 908 with the warm off-gas 940 being cleaned at a filter 920 before being released. Syngas from the primary reactor 902 and the fluid bed 909 is moved to a secondary reactor 911 for thermal destruction of PFAS at 900 to 1100° C. A syngas cyclone 913 separates syngas for further reaction in the secondary reactor 911 or moves treated syngas to a wet quench 914 wet scrubber 915 and dry scrubber 916 system from which clean off-gas and spent GAC is released.

In some not illustrated forms the full scale commercial plant will include feed preheating and drying with waste heat from the cooling of the discharge soil. The treated soils are beneficially at approximately 80° C. for magnetic separation. This allows return of the ilmenite or other catalyst for reuse.

It will be understood to persons skilled in the art that many other modifications may be made without departing from the spirit and scope of the process, and apparatus as disclosed herein.

In the claims which follow and in the preceding description, except where the context requires otherwise due to express language or necessary implication, the word "comprise" or variations thereof such as "comprises" or "comprising" is used in an inclusive sense, i.e. to specify the presence of the stated features but not to preclude the presence or addition of further features in various embodiments of the process and apparatus as disclosed herein.

The invention claimed is:

1. A process for processing a carbonaceous material, the process comprising:
    delivering the carbonaceous material to a first reactor;
    delivering a catalyst in the form of hot sand or other solid media in the form of sand to the first reactor, wherein the catalyst is delivered through a sand distribution assembly comprising a plurality of inputs into the first reactor, the plurality of inputs being controlled through adding fluidized air to the sand distribution assembly to decreases a density in a riser chamber and move the catalyst into the plurality of inputs;
    processing the carbonaceous material at a first temperature within the first reactor to decompose and/or devolatilise at least a portion of the carbonaceous material;
    delivering an output from the first reactor to a secondary reactor for thermal destruction of a portion of the output;
    the secondary reactor having a second temperature that is higher than the first temperature.

2. The process of claim 1, wherein the temperature within the first reactor is between 50° and 700° C.

3. The process of claim 1, further comprising recovering at least a portion of the catalyst from the output material and regenerating the catalyst for re-use.

4. The process of claim 3, wherein the catalyst comprises an iron oxide based catalyst.

5. The process of claim 3, wherein the catalyst comprises ilmenite.

6. The process of claim 1, wherein delivery of the catalyst at various points along the length of the first reactor divides the first reactor into reaction zones.

7. The process of claim 1 wherein the carbonaceous material comprises per and poly-fluoroalkyl compounds as a contaminate.

8. The process of claim 1, wherein the carbonaceous material comprises contaminated organic material.

9. The process of claim 1, further comprising separating biochar from the output material.

10. The process of claim 1, wherein the output is a syngas output from the first reactor.

11. The process of claim 10, wherein the secondary reactor contains a catalyst in the form of hot sand.

12. The process of claim 10, wherein the secondary reactor and the first reactor use a common recirculated media.

13. The process of claim 1, further comprising recovering a solid carbon-based material.

* * * * *